(12) United States Patent
Kasabov et al.

(10) Patent No.: US 10,579,925 B2
(45) Date of Patent: Mar. 3, 2020

(54) METHOD AND SYSTEM FOR PREDICTING OUTCOMES BASED ON SPATIO/SPECTRO-TEMPORAL DATA

(71) Applicant: AUT VENTURES LIMITED, Auckland (NZ)

(72) Inventors: Nikola Kirilov Kasabov, Auckland (NZ); Zeng-Guang Hou, Beijing (CN); Valery Feigin, Auckland (NZ); Yixiong Chen, Shanghai (CN)

(73) Assignee: AUT Ventures Limited, Auckland (NZ)

( * ) Notice: Subject to any disclaimer, the term of this patent is extended or adjusted under 35 U.S.C. 154(b) by 967 days.

(21) Appl. No.: 14/914,326

(22) PCT Filed: Aug. 26, 2014

(86) PCT No.: PCT/NZ2014/000176
§ 371 (c)(1),
(2) Date: Feb. 25, 2016

(87) PCT Pub. No.: WO2015/030606
PCT Pub. Date: Mar. 5, 2015

(65) Prior Publication Data
US 2016/0210552 A1     Jul. 21, 2016

(30) Foreign Application Priority Data

Aug. 26, 2013 (NZ) ........................ 614708

(51) Int. Cl.
*G06N 3/08* (2006.01)
*G06N 7/00* (2006.01)
*G06N 3/04* (2006.01)

(52) U.S. Cl.
CPC ............. *G06N 3/088* (2013.01); *G06N 3/049* (2013.01); *G06N 3/086* (2013.01); *G06N 7/005* (2013.01)

(58) Field of Classification Search
None
See application file for complete search history.

(56) References Cited

U.S. PATENT DOCUMENTS 6,658,287 B1 * 12/2003 Litt ................... A61B 5/0476
                                                  600/544
7,430,546 B1 * 9/2008 Suri ........................ G06N 3/08
                                                    706/16

(Continued)

FOREIGN PATENT DOCUMENTS

WO    WO 2007/071070    6/2007
WO    WO 2010/044683    4/2010

(Continued)

OTHER PUBLICATIONS

Kasabov N. Evolving spiking neural networks and neurogenetic systems for spatio-and spectro-temporal data modelling and pattern recognition. In IEEE World Congress on Computational Intelligence Jun. 10, 2012 (pp. 234-260). Springer, Berlin, Heidelberg. (Year: 2012).*

(Continued)

*Primary Examiner* — Alexey Shmatov
*Assistant Examiner* — Casey R. Garner
(74) *Attorney, Agent, or Firm* — Baker Botts L.L.P.; Michael A. Sartori

(57) ABSTRACT

This invention involves use of temporal or spatio/spector-temporal data (SSTD) for early classification of outputs that are results of spatio-temporal patterns of data. Classification models are based on spiking neural networks (SNN) suitable to learn and classify SSTD. The invention may predict early events in many applications, i.e. engineering, bioinformatics, neuroinformatics, predicting response to treatment of neurological and brain disease, ecology, environment, medicine, and economics, among others. The invention involves a method and system for personalized modelling of SSTD (Continued)

and early prediction of events based on evolving spiking neural network reservoir architecture (eSNNr). The system includes a spike-time encoding module to encode continuous value input information into spike trains, a recurrent 3D SNNr and an eSSN as an output classification module.

11 Claims, 44 Drawing Sheets

(56) References Cited

U.S. PATENT DOCUMENTS

| | | | | |
|---|---|---|---|---|
| 9,053,431 | B1* | 6/2015 | Commons | G06N 3/0454 |
| 2004/0122335 | A1* | 6/2004 | Sackellares | A61B 5/04008 |
| | | | | 600/544 |
| 2009/0221928 | A1* | 9/2009 | Einav | A61B 5/0484 |
| | | | | 600/544 |
| 2009/0287624 | A1* | 11/2009 | Rouat | G06K 9/4623 |
| | | | | 706/20 |
| 2010/0179935 | A1 | 7/2010 | Srinivasa et al. | |
| 2010/0235310 | A1* | 9/2010 | Gage | G06N 3/082 |
| | | | | 706/14 |
| 2011/0307228 | A1* | 12/2011 | Kasabov | G06Q 10/04 |
| | | | | 703/2 |
| 2013/0339280 | A1* | 12/2013 | Hunzinger | G06N 3/08 |
| | | | | 706/25 |

FOREIGN PATENT DOCUMENTS

| | | |
|---|---|---|
| WO | WO 2013/188788 | 12/2013 |
| WO | WO 2014/081639 | 5/2014 |

OTHER PUBLICATIONS

Pfurtscheller G, Leeb R, Keinrath C, Friedman D, Neuper C, Guger C, Slater M. Walking from thought. Brain research. Feb. 3, 2006; 1071(1):145-52. (Year: 2006).*

Schliebs S, Hamed HN, Kasabov N. Reservoir-based evolving spiking neural network for spatio-temporal pattern recognition. InInternational Conference on Neural Information Processing Nov. 13, 2011 (pp. 160-168). Springer, Berlin, Heidelberg. (Year: 2011).*

Kasabov N. Evolving spiking neural networks for spatio-and spectro-temporal pattern recognition. In2012 6th IEEE International Conference Intelligent Systems Sep. 6, 2012 (pp. 27-32). IEEE. (Year: 2012).*

Kasabov, N. "Evolving, Probabilistic Spiking Neural Networks and Neurogenetic Systems for Spatio-Temporal Data Modelling and Pattern Recognition" vol. 1, Issue 2, Winter 2012—Natural Intelligence: the INNS Magazine—pp. 23-37.

Schliebs, S. et al. "Integrated feature and parameter optimization for an evolving spiking neural network: Exploring heterogeneous probabilistic models" Neural Networks 22 (2009) 623-632.

Soltic S. et al. "Evolving spiking neural networks for taste recognition" 2008 International Joint Conference on Neural Networks (IJCNN 2008) pp. 2091-2097.

* cited by examiner

| $V_x$ | $w_1$ | $w_2$ | ... | $w_v$ | $K_x$ | $s_1$ | $s_2$ | ... | $s_k$ | $M_x$ | $p_1$ | $p_2$ | ... | $p_m$ |

Feature length: 240 (Experiment 1)

(a)

(b)

(a)

(b)

(a)

(b)

METHOD AND SYSTEM FOR PREDICTING OUTCOMES BASED ON SPATIO/SPECTRO-TEMPORAL DATA

CROSS REFERENCE TO RELATED APPLICATIONS

This patent application is the United States National Phase of PCT Application No. PCT/NZ2014/000176 filed 26 Aug. 2014, which claims priority from to New Zealand Patent Application Serial Number 614708 filed 26 Aug. 2013, each of which is incorporated by reference.

TECHNICAL FIELD

The invention relates to a novel method and system for personalised (individualised) modelling of spatio/spectro-temporal data (SSTD) and early prediction of events. More particularly, the invention relates to a novel method and system based on an evolving spiking neural network reservoir architecture (eSNNr) which may be used for spatio-temporal pattern recognition (STPR) and for early prediction of events.

BACKGROUND ART

PCT Patent Publication No. WO 2010/044683 describes a personalised modelling method and system as graphically shown in FIG. 1a. The input variables/features (V), their weighting (W), the number K and the neighbourhood of samples (S), as well the model Mx and its parameters (P) are optimised together as a common chromosome used in a genetic algorithm (GA) (FIG. 1b). This method is explored on different applications in [2,29].

A disadvantage of the prior art is its inability to work on spatio-temporal data for an early classification of outputs resulting from spatio-temporal patterns of data.

Spatio- and spectro-temporal data (SSTD) that are characterised by a strong temporal component are the most common types of data collected in many domain areas. However, there is lack of efficient methods for modelling such data. In particular there is a need for spatio-temporal pattern recognition that can facilitate better understanding, better interpretation and new discoveries from complex SSTD and produce more accurate results including early prediction of spatio-temporal events. This is especially relevant for serious personal events such as stroke and heart failure, where it would be desirable to predict these events accurately and at the earliest time possible. This is also crucial for personalised brain data processing and personalised brain-computer interfaces (BCI). But this also relates to ecological and environmental event prediction, such as earthquakes and spread of invasive species, to biological events, such as gene and protein expression, etc.

It is an object of the present invention to provide an improved method and system to address this challenge.

Alternatively, it is an object of the present invention to address the foregoing problems or at least to provide the public with a useful choice.

SUMMARY OF THE INVENTION

According to a first aspect of the invention there is provided a computer-implemented method of creating an evolving spiking neural network personalized model Mx for use in determining a prognostic outcome specific to a subject x represented as input data SSTDx, wherein the input data of x comprises a number of static and dynamic variables in relation to a scenario of interest and wherein the model Mx comprises a spiking neural network reservoir and a spiking neural network classifier, the method comprising:

extracting from a global dataset D of samples also having the same static and dynamic variable features relating to the scenario as the data of x, and for which an outcome is known, a subset Kx having static variable features that most closely accord to the static variable features of the subject x, and wherein the method further comprises:

encoding the data into spike sequences, wherein the spike sequences represent individual input patterns;

constructing the spiking neural network reservoir;

mapping the input variables into reservoir input neurons located according to the spatial location of the input variables in the data, or according to the temporal similarity of the input variables;

training the spiking neural network reservoir to learn the spike sequences;

constructing the spiking neural network classifier; and training the spiking neural network classifier to recognise and classify similar input spike sequences related to a future event at an earlier time point of prediction.

Preferably, the spiking neural network reservoir is a three dimensional spiking neural network reservoir.

Preferably, the step of mapping the input variables into the reservoir comprises mapping the temporal input variables into spatially located input neurons in the reservoir.

Preferably, the step of mapping input variables into the reservoir comprises mapping spatio-temporal brain data, including EEG, fMRI and other brain data, using a standard brain structural template.

Preferably, the spiking neural network classifier is also trained, when recalled on new data, to classify spike sequences before the entire spike sequence has propagated through the spiking neural network reservoir.

According to a second aspect of the invention there is provided the use of an evolving spiking neural network personalized model Mx in a computer-implemented method of determining a prognostic outcome specific to a subject x represented as input data SSTDx, wherein the input data of x comprises a number of static and dynamic variable features in relation to a scenario of interest, wherein the evolving spiking neural network personalised model Mx is created by extracting from a global dataset D of samples also having the same static and dynamic variable features relating to the scenario as the data of x, and for which an outcome is known, a subset Kx having static variable features that most closely accord to the static variable features of the subject x.

According to a third aspect of the present invention there is provided a computer-implemented method of optimizing a model Mx suitable for use in data analysis and determining a prognostic outcome at a future time point specific to a subject x, represented as input data SSTDx, wherein the SSTDx comprises a number of static and dynamic (temporal) variable features Vx in relation to a scenario of interest for which there is a global dataset D of samples also having the same features relating to the scenario as the subject x and the data SSTDx, and for which an outcome is known, the method comprising:

selecting suitable samples Kx from within the global dataset D having static variable features that most closely accord to the static variable features of the subject x and the related data SSTDx;

creating an evolving spiking neural network personalized model Mx for predicting an outcome to x, the model Mx being created based on the dynamic variable features of the samples Kx;

applying an optimisation procedure to increase the accuracy of the prediction while reducing the time point of future event prediction; and generating a prediction of the prognostic outcome of subject x using model Mx.

Preferably, the method also comprises:

determining what number and a subset Vx of variable features will be used in assessing the outcome for the subject x;

ranking the Vx variable features within the neighbourhood Dx in order of importance to the outcome of x and obtaining a weight vector Wx for all variable features Vx;

Preferably, the step of applying an optimisation procedure comprises:

testing the accuracy of the model Mx for each sample from Dx;

storing both the accuracy of the model Mx for each sample from Dx and the corresponding model parameters;

repeating the steps of determining Kx and/or Vx while performing an optimisation procedure to optimise Kx and/or Vx, to determine their optimal values, before repeating the steps of creating the model Mx, testing and storing the accuracy and model parameters of the model Mx for each sample from Dx.

More preferably, the subject is an individual.

According to a fourth aspect of the invention there is provided a computer-implemented method of generating a prediction of stroke occurrence for an individual using the method of the first and/or third aspects of the invention, and/or by applying the use of the second aspect of the invention. This includes the method for mapping temporal variables into the 3D reservoir spiking neural networks structure as presented herein.

According to a fifth aspect of the invention there is provided a computer-implemented method of classifying unclassified SSTD brain data (STBD) using the method of the first and/or third aspects of the invention, and/or by applying the use of the second aspect of the invention.

Preferably, the method comprises:

transforming the STBD into spike sequences;

mapping the brain data input variables into the 3D spiking neural network reservoir;

creating a brain data classification model, the model comprising a 3D spiking neural network reservoir and a classifier, the spiking neural network reservoir configured to spatially map the brain data and to provide spiking activity patterns to the classifier;

training the brain data classification model using archive brain data, the archive brain data comprising STBD with known classifications, wherein training the brain data classification model comprises the steps of:

providing the archive brain data as input to the spiking neural network reservoir to train the spiking neural network reservoir to provide similar spiking activity patterns for similar input spike sequences to the classifier; and providing the archive brain data with corresponding known classifications as input to the spiking neural network reservoir, the known classifications used to train the classifier to recognise and classify similar spiking activity patterns; and using the brain data classification model to classify the unclassified brain data.

According to another aspect of the invention there is provided a computer-implemented method of generating a prediction of an ecological event based on spatio-temporal data using the method of the first and/or third aspects of the invention (including methods involving data mapping into the SNN reservoir), and/or by applying the use of the second aspect of the invention.

According to another aspect of the invention there is provided a computer-implemented method of controlling a state of an apparatus using brain signals using the method of the first and/or third aspects of the invention (including methods involving brain data mapping into the reservoir), and/or by applying the use of the second aspect of the invention.

Preferably, the method comprises:

receiving brain data corresponding to a desired state of the apparatus;

mapping the data into the spiking neural network reservoir;

learning of the data into the spiking neural network reservoir;

classifying the brain data using the trained model and a spiking neural network classifier;

determining the desired state of the apparatus based on the classified brain data;

sending data indicative of the desired state of the apparatus to a controller, wherein the controller is configured to control the apparatus in accordance with the desired state of the apparatus.

Preferably, the method of controlling a state of an apparatus is applied to a method of rehabilitation, comprising:

acquiring brain data from the patient, the patient being equipped with one or more rehabilitation actuator(s) adapted to induce movement of a body part, the brain data corresponding to a desired movement of the body part;

mapping the data into the spiking neural network reservoir;

learning of the data into the spiking neural network reservoir;

classifying the brain data;

controlling the rehabilitation actuator(s) using brain activity to produce the desired movement of the body part; and if necessary, repeating the method until the patient improves his/her brain signals and body activity to produce the desired movement without the rehabilitation actuator.

According to another aspect of the invention, there is provided a computer-readable medium having stored thereon instructions which, when executed on a computer, cause the computer to perform a method according to any one of the first to sixth aspects of the invention.

According to another aspect of the invention, there is provided a computer system suitably programmed to execute the method steps according to any one of the first to sixth aspects of the invention.

According to another aspect of the invention, there is provided a method for the analysis of a 3D spiking neural network reservoir after training with temporal or spatio-temporal data that utilises the method of any one of the earlier aspects of the invention.

Further aspects of the invention, which should be considered in all its novel aspects, will become apparent to those skilled in the art upon reading of the following description which provides at least one example of a practical application of the invention.

BRIEF DESCRIPTION OF DRAWINGS

Further aspects of the present invention will become apparent from the following description which is given by way of example only and with reference to the accompanying drawings in which:

FIG. 1b is a representation of a chromosome used in a genetic algorithm described in WO 2010/044683;

DETAILED DESCRIPTION OF PREFERRED EMBODIMENTS THE INVENTION

Summary

Figure 1A:
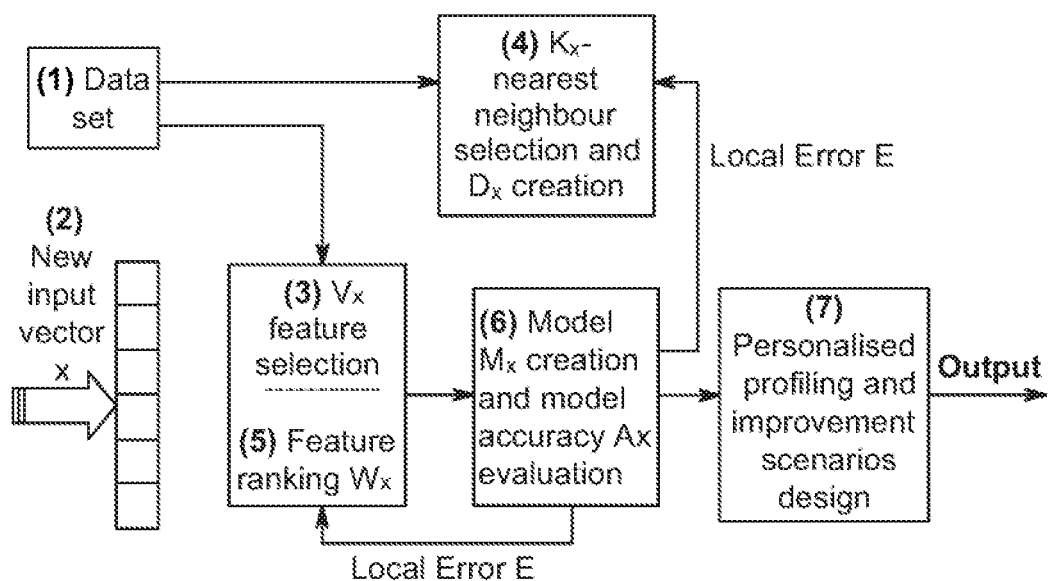
FIG. 1a is a block diagram of a personalised modelling method described in WO 2010/044683.

The present invention involves novel developments over the prior art in order to use temporal or spatio-/spectro temporal data (SSTD) for an early classification of outputs that are results of spatio-temporal patterns of data. Classification models according to preferred embodiments of the invention are based on spiking neural networks (SNN), suitable to learn and classify SSTD, rather than on classifiers that classify static, vector-based data as it is in WO 2010/044683.

The present invention can be used to predict early events in many applications, for example engineering (surveillance for crime prediction and prevention; cyber security), bioinformatics (gene expression and protein folding), neuroinformatics (EEG, fMRI) and its application for Brain Computer Interfaces (BCI) neurorehabilitation, predicting response to treatment of neurological disease; predicting progression of brain disease, such as Alzheimer's Disease; ecology (predicting establishment of species), environment (predicting global warming process), medicine (patients risk of disease or recovery over time), and economics (financial time series, macroeconomics), among others.

Preferred embodiments of the present invention involve a novel method and system for personalised (individualised) modelling of spatio/spectro-temporal data (SSTD) and early prediction of events. The method and system are based on an evolving spiking neural network reservoir architecture (eSNNr). The system comprises: a spike-time encoding module to encode continuous value input information into spike trains, a recurrent 3D SNNr and an eSNN as an output classification module. This system may be applied to spatio-temporal pattern recognition (STPR) and early prediction of events. These preferred embodiments involve novel developments over the methods and systems disclosed in the prior art on personalised modelling [1,2], including, among others, important differences such as:

(1) It is the first personalised modelling method and system developed to deal with SSTD.
(2) The same paradigm, spiking information processing, used in the brain efficiently for STPR tasks, is used here to represent and to process SSTD in the form of spiking neural networks (SNN).
(3) An information model, created for SSTD, does not only use the available data, but also prior knowledge, namely structural and functional information about the source of the data. A 3D SNNr system has a spatial structure that if necessary approximates spatially located areas where STBD is collected, such as brain data or spatial geographic data, through a suitable location/mapping of the input variables in the 3D reservoir structure according to the proposed methods of embodiments of the invention.
(4) Brain-like learning rules, such as Spike-Time Dependant Plasticity (STDP) [23], are used to learn temporal cause-effect relationships between spatially distributed neurons in the SNNr system to reflect on spatio-temporal interaction in the input data.
(5) The system is evolving as previously unknown classes can be added incrementally as a result of new SSTD patterns being learned and recognised, which is also a principle of brain cognitive development.
(6) The system retains a transparent spatio-temporal memory that can be mined and interpreted either in real time or retrospectively for new knowledge discovery.
(7) The system is able to recognise and predict the outcome of a new SSTD pattern that is similar to previously learnt patterns even before the new pattern is fully presented to its inputs.
(8) For the first time a system is created for early stroke occurrence prediction based on contemporary SSTD.
(9) A new system for brain data modelling and pattern recognition has been developed.
(10) A new type of brain-computer interface based on EEG SSTD has been developed.
(11) A new engineering robotic system for neuro-rehabilitation has been developed.
(12) A new ecological modelling system to predict ecological events has been developed.

A method according to an exemplary embodiment of the invention comprises the following steps:
1) A subset of SSTD is collected as nearest neighbour data for a new individual.
2) Input SSTD is encoded into spike sequences;
3) Spike sequences are entered (mapped) into pre-defined spatial locations of the input variables in a SNNr comprising of recurrently connected computational elements—neurons. The input variables representing temporal data are first allocated/mapped into pre-selected neurons of the SNN reservoir according to the proposed methods of embodiments of the invention.
4) Whole patterns of SSTD entered as spike sequences are learned in the SNNr in an unsupervised way, each pattern activating a specific trajectory of neuronal connections and spiking activity in the SNNr.
5) Spike sequences that represent internal patterns of the SNNr are learned to be classified into pre-defined classes in an output classifier.

It is possible that an individual for which a personalised model is developed is described by a set of static variables and a set of dynamic, temporal variables. In this case for every new individual, a neighbourhood of closest data is selected based on the static variables. After that the temporal data of this neighbourhood of samples is used to train a personalised model based on the proposed SNNr system and to classify (predict) as early and as accurate as possible an output event for the new vector under the current temporal conditions. The process of optimisation of neighbourhood data, input features and classifier parameters can be achieved using optimisation methods known in the art, such as the optimisation method described in WO 2010/044683 [1].

Spiking Neural Network Personalised Modelling Method and System for Temporal and Spatio-Temporal Pattern Recognition and Early Event Prediction A method for PM (personalised modelling) according to an embodiment of the present invention comprises the following steps:
1. For a new individual x described by a number of static variables Sx and by a number of dynamic (temporal) variables Tx with unknown output (event) Ox in future times, select the closest individuals to x according to the static variables from a data repository of individuals with known output and known time of event occurrence using a method described in [1] or otherwise known in the art.
2. Create an evolving SNN personalised model according to embodiments of the invention described herein, denoted as PMeSNNr, to predict the chances of event occurrence for x using the dynamic data sets of the neighbouring individuals for training the model and the dynamic set Tx of the individual for recall.
3. Estimate the time in the future when there is a chance for an event to happen to the individual x, the accuracy of this prediction and the likelihood of the event to happen.
4. If necessary, optimise iteratively the features, the neighbourhood and the parameters of the PMeSNNr using a personalised optimisation procedure from [1] or otherwise known in the art to achieve a maximum accuracy for an earliest possible time of prediction.

5. Analyse the trained SNN reservoir for a better understanding of the personalised SSTD and for personalised profiling.

Figure 2:
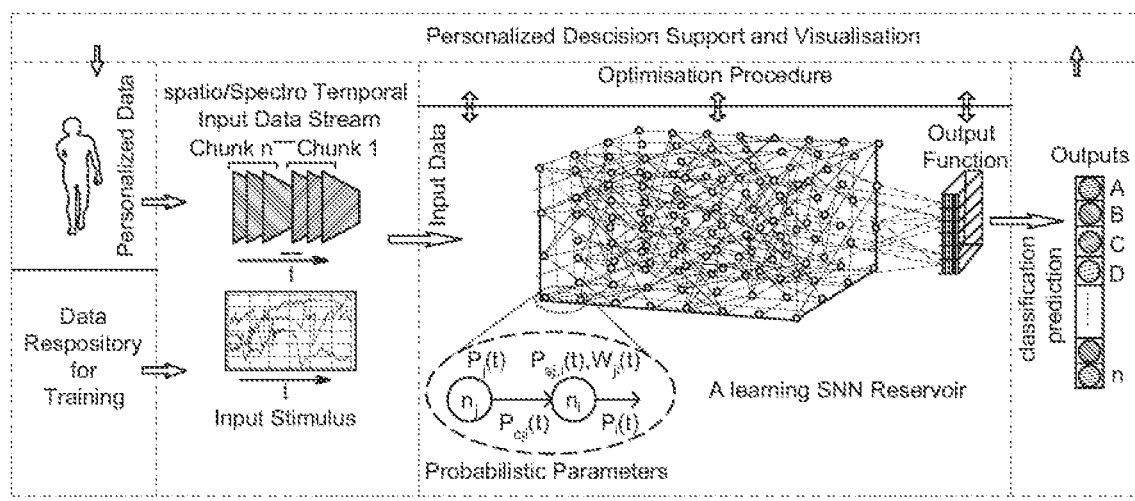
FIG. 2 is a schematic diagram of a personalised modelling method according to an embodiment of the invention.

FIG. 2 illustrates, in the form of modules, a method for the creation of a PMeSNNr model according to an embodiment of the present invention, comprising the following steps:

a. Encode SSDT into spike sequences—continuous value input information is encoded into trains of spikes;

b. Construct and train a recurrent 3D SNN reservoir—SNNr, so that the input variables that represent temporal data are located at optimal 3D coordinates in the 3D SNNr according to the method of preferred embodiments of the invention and train the SNNr to learn the spike sequences that represent individual input patterns;

c. Construct and train a SNN classifier to learn to recognise different trajectories of the SNNr that represent separate input patterns belonging to different classes and when recalled on new data, to recognise and classify similar patterns earlier in time.

d. If necessary, optimise the model—optimise input features, the neighbourhood and the parameters of the MPeSNNr model through iterative application of steps (a) to (c) above for different parameter values until maximum accuracy is achieved at an earliest time of prediction.

e. Recall the model for the input data x.

f. Analyse the trained SNN reservoir for a better understanding of the personalised SSTD and for personalised profiling.

(a) the Data Encoding Module

Figure 3:
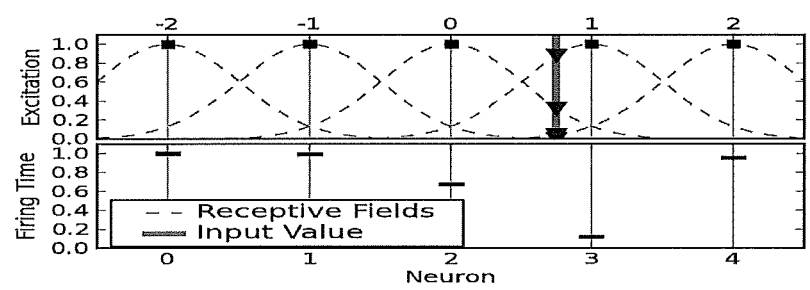
FIG. 3 is a graph of an example of population rank-order coding according to an embodiment of the invention.

FIG. 3 shows an example of encoding a single value of input data (shown as a thick vertical line) into a spike train of 5 spikes emitted by 5 neurons based on their receptive fields (Gaussian functions). This method is based on population rank coding. Other possible methods that can be used to encode the input SSTD into spike sequences include: Address Event Representation (AER); Ben's Spike Algorithm or any other method.

These series of input spike trains may be entered into spatially dedicated input neurons from the 3D SNNr depending on the problem in hand, e.g. entering temporal sequences into input neurons from the SNNr so that similar temporal sequences are entered into topologically closer neurons; entering brain data sequences to spatially located neurons that map brain areas where data is collected. Spike trains may be continuously fed into the SNNr in their temporal order.

(b) the SNNr Module

After selecting the neighbourhood for an individual x based on static data, a learning phase may take place to build a personalised model Mx as a PMeSNNr. Temporal input data of all neighbours of x may be propagated one by one or in parallel in the spatially located input neurons, as proposed in this description, of the SNNr and learned as whole patterns in it. After a whole input pattern is entered (and learned) in the SNNr, the dynamic state of the SNNr can be measured and an output classifier can be trained to recognise this state in a predefined output class for this input pattern.

Figure 4:
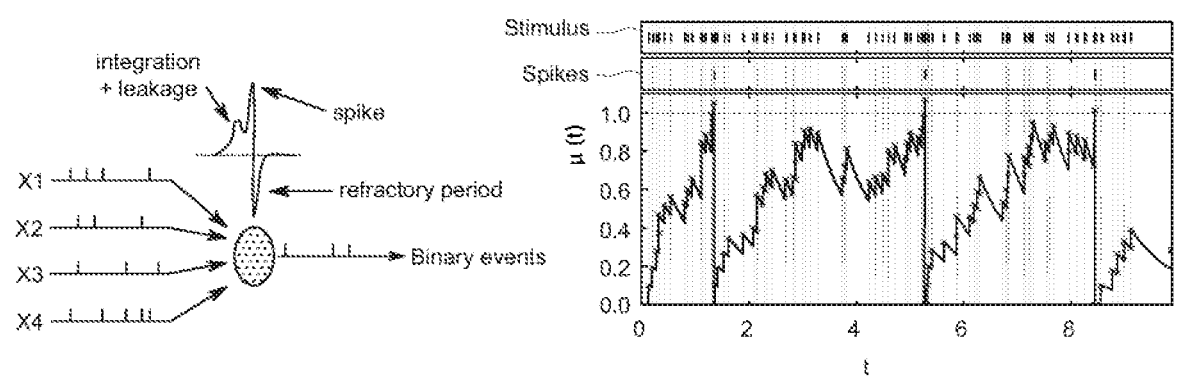
FIG. 4 is a schematic diagram and graph of a Leaky Integrate and Fire model (LIFM) according to an embodiment of the invention.

FIG. 4 shows a Leaky Integrate and Fire Model (LIFM) of a neuron according to an embodiment of the invention. The SNNr may have a 3D structure connecting leaky-integrate and fire model (LIFM) spiking neurons with recurrent connections [3-10]. In the SNNr, a spike-time dependent plasticity learning rule (STDP) can be used for the neurons to learn spatio-temporal dependencies from the input data and to adapt their connections in order to generate specific trajectories when a particular input pattern is entered [3,4].

The model according to an embodiment of the invention as illustrated in FIG. 2 may use a special class of the LIFM—the probabilistic neuron model [19] that has probability parameters attached to the connections, the synapses and the output of the spiking neuron. The SNNr connectivity is initialised as small world connections, where closets neurons are connected with a higher probability.

According to some embodiments of the invention, once spike trains are entered into the SNNr, it acts as a larger dimensional space. The SNNr accumulates temporal information of all input spike trains and transforms them into high-dimensional intermediate states/trajectories that can be measured and recognised over time. Due to the suitable spatial mapping/location of the input neurons, the recurrent reservoir generates unique accumulated neuron spike time responses for different classes of input spike trains from different input samples.

(c) the Output Classification Module

According to some embodiments of the invention, using LIFM of a spiking neuron, rank order (RO) learning can be implemented to achieve fast, one-pass learning with the emphasis of the first incoming spike on a synapse as suggested in [11] and previously used in [12]. One of the originality of the proposed patent is that it utilises for the first time the ability of SNN based on LIFM neurons to recognise early complex spatio-temporal patterns generated in the SNNr and to predict events early before new input data is entered entirely into the SNNr.

In some embodiments of the invention, evolving SNN (eSNN) can be employed as a classifier as these SNN apply rank-order (RO) learning principle [11-16]. Different types of eSNN can be used, including:

Simple eSNN [13,14,16];

Dynamic eSNN (deSNN) as introduced in [15], where RO learning is used for initialisation of a synaptic weight based on the first incoming spike on this synapse, but than this weight is modified based on following spikes using spike time dependent plasticity (STDP) learning rule;

Spike pattern association neurons (SPAN) as classifiers, where as a reaction to a recognised input pattern, a precise time sequence of spikes is generated at the neuronal output [17,18].

The RO learning rule allows in principle for a SNN to learn complex spatio-temporal patterns from data streams and then to recognise early an incoming pattern (therefore not necessarily 'waiting' for the whole pattern to be presented). Some embodiments of the invention use this property of the LIFM and SNN for building accurate personalised models to predict early onset of an event for an individual, based on historical SSTD of many individuals for which the event had happened and current, temporal data for the new individual.

Figure 5:
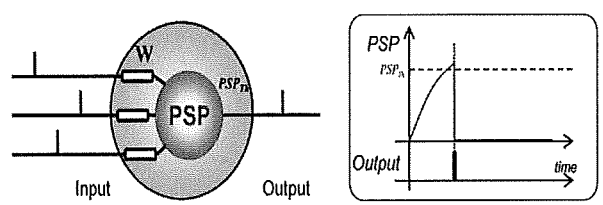
FIG. 5 is a schematic diagram and graph of LIFM and rank-order learning according to an embodiment of the invention.

FIG. 5 shows schematically an eSNN classifier that uses LIFM and RO learning according to an embodiment of the invention. The RO learning motivation is based on the assumption that most important information of an input pattern is contained in earlier arriving spikes [13,14]. It establishes a priority of inputs based on the order of the spike arrival on the input synapses for a particular pattern. RO learning makes use of the information contained in the order of the input spikes (events). This method has two main advantages when used in SNN: (1) fast learning (as the order of the first incoming spikes is often sufficient information for recognising a pattern and for a fast decision making and only one pass propagation of the input pattern may be sufficient for the model to learn it); (2) asynchronous, data-driven processing.

eSNN utilize the principles of evolving connectionist systems [13,20]. An eSNN evolves its structure and functionality in an on-line manner, from incoming information. For every new input data vector, a new output neuron is dynamically allocated and connected to the eSNN input neurons (these are the neurons of the SNNr). The connections are established using the RO rule for the output neuron to recognise this input vector or a similar one as a positive example. The weight vectors of the output neurons represent centres of clusters in the problem space and can be represented as fuzzy rules [21].

In some embodiments of the invention, neurons with similar weight vectors are merged based on Euclidean distance between them. That makes it possible to achieve a very fast learning (only one pass may be sufficient), both in a supervised and in an unsupervised mode [13,14].

During a learning phase of the classifier according to some embodiments of the invention, for each M-dimensional input pattern $P_i$ a new output neuron i is created and its connection weights $w_{j,i}$ (j=1, 2, . . . , M) to the input neurons are calculated based on the order of the incoming spikes on the corresponding synapses using the RO learning rule:

$$w_{j,i} = \alpha \cdot \mathrm{mod}^{order(j,i)} \quad (1)$$

where: $\alpha$ is a learning parameter (in a partial case it is equal to 1); mod is a modulation factor, that defines how important the order of the first spike is; $w_{j,i}$ is the synaptic weight between a pre-synaptic neuron j and the postsynaptic neuron i; order(j,i) represents the order (the rank) of the first spike at synapse ranked among all spikes arriving from all synapses to the neuron i; order(j,i) has a value 0 for the first spike to neuron i and increases according to the input spike order at other synapses.

While the input training pattern (example) is presented (all input spikes on different synapses, encoding the input vector are presented within a time window of T time units), the spiking threshold $Th_i$ of the neuron i is defined to make this neuron spike when this or a similar pattern (example) is presented again in the recall mode. The threshold is calculated as a fraction (C) of the total PSP; (denoted as $PSP_{imax}$) accumulated during the presentation of the input pattern:

$$PSP_{imax} = \Sigma_{(j)} \mathrm{mod}^{order(j,i)} \quad (2)$$

$$Th_i = C \cdot PSP_{imax} \quad (3)$$

If the C parameter has a value of 1 it means that during a recall phase the neuron would need the whole pattern to be propagated in order for the neuron to emit an output spike. A value of 0 will make this neuron spike immediately (and definitely wrongly) after the first input spike is entered into the neuron. But modifying C from a value of 1 down to 0 (not reaching it) will make it possible for the neuron, once trained on the whole input pattern, to emit a spike if only part of it is presented during recall. And it has to be a correct classification which requires a careful optimisation of the C value in order to achieve correct and earliest spiking activity of the output neurons.

Here, optimising C, means how much early an output class will be recognised after the start of a spatio-temporal data pattern entry. And the value for C will be different for different classes and different individuals, i.e. it will be individualised/personalised.

In some embodiments, if the weight vector of the evolved and trained new output neuron is similar to the one of an already trained neuron (in a supervised learning mode for classification this is a neuron from the same class pool), i.e. their difference is less than a similarity threshold Sim, the new neuron will be merged with the most similar one, averaging the connection weights and the threshold of the two neurons [13,14]. Otherwise, the new neuron will be added to the set of output neurons (or the corresponding class pool of neurons when a supervised learning for classification is performed). The similarity between the newly created neuron and a training neuron is computed with the use of the Euclidean distance between weight matrices of the two neurons. The merged neuron has weighted average weights and thresholds of the merging neurons. While an individual output neuron represents a single input pattern, merged neurons represent clusters of patterns or prototypes in a transformed spatial—RO space. These clusters can be represented as fuzzy rules.

The eSNN learning is adaptive, incremental, theoretically—'lifelong', so that the system can learn new patterns through creating new output neurons, connecting them to the input neurons, and possibly merging the most similar ones.

In some embodiments, during the recall phase, when a new input vector is presented to the eSNN the spiking pattern is submitted to all created neurons during the learning phase. An output spike is generated by neuron i at a time l if the $PSP_i(l)$ becomes higher than its threshold $Th_i$. After the first neuron spikes, the PSP of all neurons are set to initial value (e.g. 0) to prepare the system for the next pattern for recall or learning.

The postsynaptic potential $PSP_i(l)$ of a neuron i at time l is calculated as:

$$PSP_i(l) = \Sigma_{t=0,1,2,\ldots,l} \Sigma_{(j)} e_j(t) \cdot \mathrm{mod}^{order(j,i)} \quad (4)$$

where: $e_j(t)=1$ if there is a first spike at time t on synapse j; order (j,i) is the rank order of the first spike at synapse j among all spikes to neuron i for this recall pattern.

The recall procedure can be performed using the following recall algorithms implying different methods of comparing input patterns for recall with already learned patterns in the output neurons:

(a) Spikes of the new input pattern are propagated as they arrive to all trained output neurons and the first one that spikes (its PSP is greater that its threshold) defines the output. The assumption is that the neuron that best matches the input pattern will spike earlier based purely on the PSP (membrane potential).

(b) The second method implies a creation of a new output neuron for each recall pattern, in the same way as the output neurons were created during the learning phase, and then—comparing the connection weight vector of the new one to the already existing neurons using Euclidean distance. The closest output neuron in terms of synaptic connection weights is the 'winner'. This method uses the principle of transductive reasoning and nearest neighbour classification in the connection weight space. It compares spatially distributed synaptic weight vectors of a new neuron that captures a new input pattern and existing ones.

(c) As (b) but m nearest output neurons, according to their synaptic weights are considered and the output for the input pattern representing the individual x is calculated based on the weighted distance between the newly created neurons and the m neighbouring neurons and the output values (e.g. class labels in terms of classification tasks;

continuous output values in terms of regression tasks) associated with them, where the value of m is greater than 1 and is pre-defined.

An advantage of the eSNN when compared with other supervised or unsupervised learning SNN models is that it is computationally inexpensive and boosts the importance of the order in which input spikes arrive, thus making the eSNN suitable for on-line learning and early prediction of temporal events.

A version of the eSNN is the dynamic eSNN (deSNN) model [15]. In addition to the initialisation of the connection weights based on the first arriving spikes at a synaptic input, the deSNN model can adjust dynamically these connections based on following spikes on the same synaptic inputs using a version of the STDP learning rule (spike-time dependent plasticity). A small drift of a synaptic weight can be used to increase the weight if there is a spike or decrease it if there is no spike at each of time moments of simulation.

(d) The Optimisation Module

In some embodiments, for each personalised model, to select the optimal subset of features (e.g. weather variables; brain data channels or locations), the number of neighbouring samples (K) and the parameters of the classifier (for the eSNN they are Mod, Sim, C and possibly m), different values for all these parameters are tested in their combination using either a grid search or a genetic algorithm, whose chromosome is represented in FIG. 1b. In particular, different modifications of genetic algorithms can be used, e.g. Gravitational Search Algorithm [30] as experimented in [29] on static data. Other suitable methods for feature and parameter optimisation include quantum inspired genetic algorithms [31].

(e) Recall the Personalised Model for the Input Data Representing an Individual x In some embodiments, during a recall phase the stream of temporal data, which is related to the individual x, is continuously entered into the SNNr and the SNNr activity states are continuously fed into the output classifier until the classifier recognises a certain output class (event). The ability of the eSNN classifiers [14-18], once trained on whole input patterns, to recognise similar input patterns in a recall phase when only initial spikes appear on its synapses, makes eSNN very suitable for the task of early onset prediction of a personal event.

Method for Temporal Data Variable Mapping into a SNN Reservoir

Given a particular temporal data set, it is important to know how to map the data into the reservoir. Here we introduce a new method to map input temporal variables into the reservoir.

The method consists of the following steps:
1. Define the size of the 3D spiking neural network (SNN) reservoir (denoted as SNNr).
2. For v input temporal variables, generate randomly v neurons from the 3D SNN reservoir. Allocate each input variable to one of these neurons that become now inputs for the reservoir following the principle that variables that represent similar temporal patterns are allocated to closer neurons in the reservoir applying the procedure as described below.

Suppose there are s samples in the data set and there are v variables for each sample and the observed time length of each variable is t. We first choose v input neurons from the SNNr. Then we map the variables into the computing SNNr following this principle: high correlated spike trains are mapped to nearby input neurons. Because high correlation indicates that the variables are likely to be more time dependent with each other, and this relationship should also be reflected in the reservoir. Spatially close neurons in the SNNr will capture in their connections more interactions between the input variables mapped into these neurons.

Specifically, we construct two weighted graphs: the input neuron distance graph (NDG) and the signal correlation graph (SCG). In NDG, the input neurons' coordinate set, denoted by $V_{NDG}=\{(x_i,y_i,z_i)|i=1 \ldots v\}$, is the graph vertex set and the graph edges are determined in this way: each input neuron is connected to its k nearest input neurons and the edges are weighted by the inverse of the Euclidean distance between them. In SCG, we first use the Parzen window method to estimate the spike density function corresponding to each variable and then the graph vertex set, denoted by $V_{SCG}=\{f_i|i=1 \ldots v\}$, is the spike density function. The graph edges are constructed in this way: each spike density function is connected to its k highest correlated neighbours and the edges are weighted by the statistical correlation between the spike density functions of the input variables.

We adopt the graph matching technique, which is a powerful tool to solve mapping problems and has been widely used in computer vision and pattern recognition, to determine good mapping between any two weighted graphs under the mapping rule. In our case, the two graphs are NDG and SCG. For these two graphs, we can compute their adjacency matrices, written as $A_n$ and $A_s$. The graph matching method is aimed to find out a permutation matrix P that minimizes the following objective function:

$$\min_P \|A_n - PA_sP^T\|_F^2 \quad (5)$$

where $\|\cdot\|$ denotes the Frobenius matrix norm. Exactly solving this problem is known to be NP hard due to its 0-1 combinatorial optimization property. Many algorithms have been proposed to find an approximated solution. Among these algorithms the Factor Graph Matching (FGM) algorithm [10] has been demonstrated to produce state-or-art results. So here we utilize the FGM algorithm to solve problem (3) with the following settings: suppose in NDG the sum of graph edge weights of an vertex, say vertex $i_{NDG} \in V_{NDG}$, to all other vertices is $d(i_{NDG})$, and, similarly, in SCG the sum of graph edge weights of vertex $i_{SCG} \in V_{SCG}$ to all other vertices is $c(i_{SCG})$, then the difference between d $(i_{NDG})$ and $c(i_{SCG})$ reflects the similarity of the positions of $i_{NDG}$ and $i_{SCG}$ in the corresponding graphs. So we compute the similarity of the two vertices by using the formula:

$$\exp(-|d(i_{NDG})-c(i_{SCG})|^2/2\sigma_n^2); i_{NDG},i_{SCG}=1 \ldots v \quad (6)$$

For the graph edge similarity, we use the formula:

$$\exp(-|a_{ij}^{NDG}-a_{kl}^{SCG}|^2/2\sigma_e^2); i,j,k,l=1 \ldots v \quad (7)$$

where: $a_{ij}^{NDG}$, $a_{kl}^{SCG}$ are graph edge weights in NDG and SCG, respectively; $\sigma_n$ and $\sigma_e$ are two parameters to control the affinity between neurons and edges, respectively.

Figure 37:
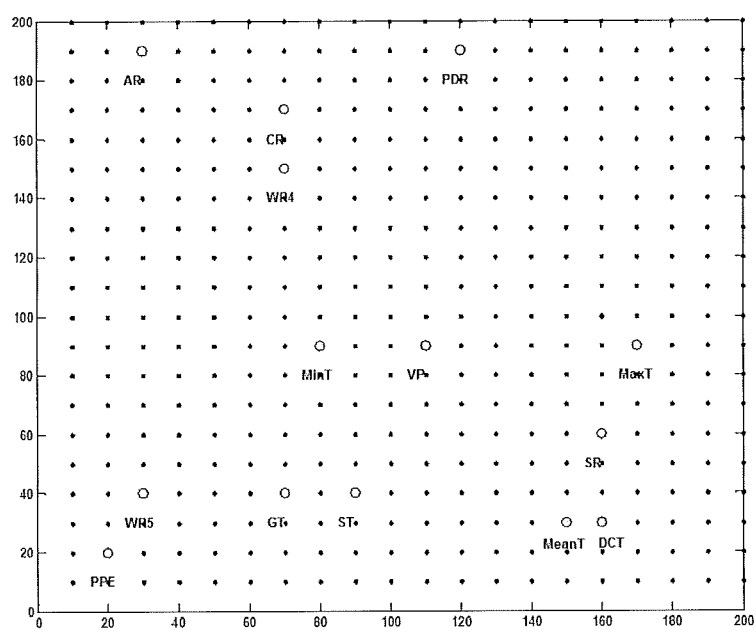
FIG. 37 is an illustration of input variable mapping according to an embodiment of the invention.

FIG. 37 shows the matching result. The left graph is the input NDG and the right graph is SCG. We can see that after matching, highly correlated features are mapped to nearby input neurons.

Given a particular spatio-temporal data set, it is important to know how to map the data into the reservoir. For some special data such as brain EEG data, there is prior information about the location of each signal channel being collected and this information can be readily utilized for mapping the signal channels into the reservoir. But for much more common applications such as climate data and ecological data, we do not have such mapping. Here we introduce a new method to map the input variables into the reservoir.

Suppose there are s samples in the data set and there are v variables for each sample and the observed time length of each variable is t. We first choose v input neurons from the SNNr. Then we map the variables into the computing SNNr following this principle: high correlated spike trains are mapped to nearby input neurons. Because high correlation indicates that the variables are likely to be more time dependent with each other, and this relationship should also be reflected in the reservoir. Spatially close neurons in the SNNr will capture in their connections more interactions between the input variables mapped into these neurons.

Specifically, we construct two weighted graphs: the input neuron distance graph (NDG) and the signal correlation graph (SCG). In NDG, the input neurons' coordinate set, denoted by $V_{NGD}=\{(x_i,y_i,z_i)|i=1 \ldots v\}$, is the graph vertex set and the graph edges are determined in this way: each input neuron is connected to its k nearest input neurons and the edges are weighted by the inverse of the Euclidean distance between them. In SCG, we first use the Parzen window method to estimate the spike density function corresponding to each variable and then the graph vertex set, denoted by $V_{SCG}=\{f_i|i=1 \ldots v\}$, is the spike density function. The graph edges are constructed in this way: each spike density function is connected to its k highest correlated neighbours and the edges are weighted by the statistical correlation between the spike density functions of the input variables.

We adopt the graph matching technique, which is a powerful tool to solve mapping problems and has been widely used in computer vision and pattern recognition, to determine good mapping between any two weighted graphs under the mapping rule. In our case, the two graphs are NDG and SCG. For these two graphs, we can compute their adjacency matrices, written as $A_n$ and $A_s$. The graph matching method is aimed to find out a permutation matrix P that minimizes the following objective function:

$$\min_P \|A_n - PA_sP^T\|_F^2 \qquad (8)$$

where $\|\cdot\|$ denotes the Frobenius matrix norm. Exactly solving this problem is known to be NP hard due to its 0-1 combinatorial optimization property. Many algorithms have been proposed to find an approximated solution. Among these algorithms the Factor Graph Matching (FGM) algorithm has been demonstrated to produce state-or-art results. So here we utilize the FGM algorithm to solve problem (3) with the following settings: suppose in NDG the sum of graph edge weights of an vertex, say vertex $i_{NDG} \in V_{NDG}$, to all other vertices is $d(i_{NDG})$, and, similarly, in SCG the sum of graph edge weights of vertex $i_{SCG} \in V_{SCG}$ to all other vertices is $c(i_{SCG})$ then the difference between $d(i_{NDG})$ and $c(i_{SCG})$ reflects the similarity of the positions of $i_{NDG}$ and $i_{SCG}$ in the corresponding graphs. So we compute the similarity of the two vertices by using the formula:

$$\exp(-|d(i_{NDG})-c(i_{SCG})|^2/2\sigma_n^2); i_{NDG}, i_{SCG}=1 \ldots v \qquad (9)$$

For the graph edge similarity, we use the formula:

$$\exp(-|a_{ij}^{NDG}-a_{kl}^{SCG}|^2/2\sigma_e^2); i,j,k,l=1 \ldots v \qquad (10)$$

where: $a_{ij}^{NDG}$, $a_{kl}^{SCG}$ are graph edge weights in NDG and SCG, respectively; $\sigma_n$ and $\sigma_e$ are two parameters to control the affinity between neurons and edges, respectively.

FIG. 37 shows the matching result. The left graph is the input NDG and the right graph is SCG. We can see that after matching, highly correlated features are mapped to nearby input neurons.

After defining the input neurons in the SNNr where temporal data will be entered, an unsupervised learning procedure is applied in the SNNr and then—a supervised learning procedure for the classifier as described already in this specification.

The proposed input variable allocation/mapping method would make the SNNr interpretable for new knowledge discovery and would lead to a significantly better accuracy of classification or prediction of events as demonstrated in the methods proposed in embodiments of the invention for stroke event prediction and ecological event prediction.

Method and System for Personalised Stroke Occurrence Prediction Based on the Invention The stroke occurrence prediction problem can be formulated as follows: Given historical data, both static and temporal, of persons who had stroke in the past, can we predict accurately and early enough what the risk of stroke occurrence for a new person will be in a near future time (e.g. days, hours)? This and other stroke related problems have been described and studied in the past with limited success.

Figure 6:
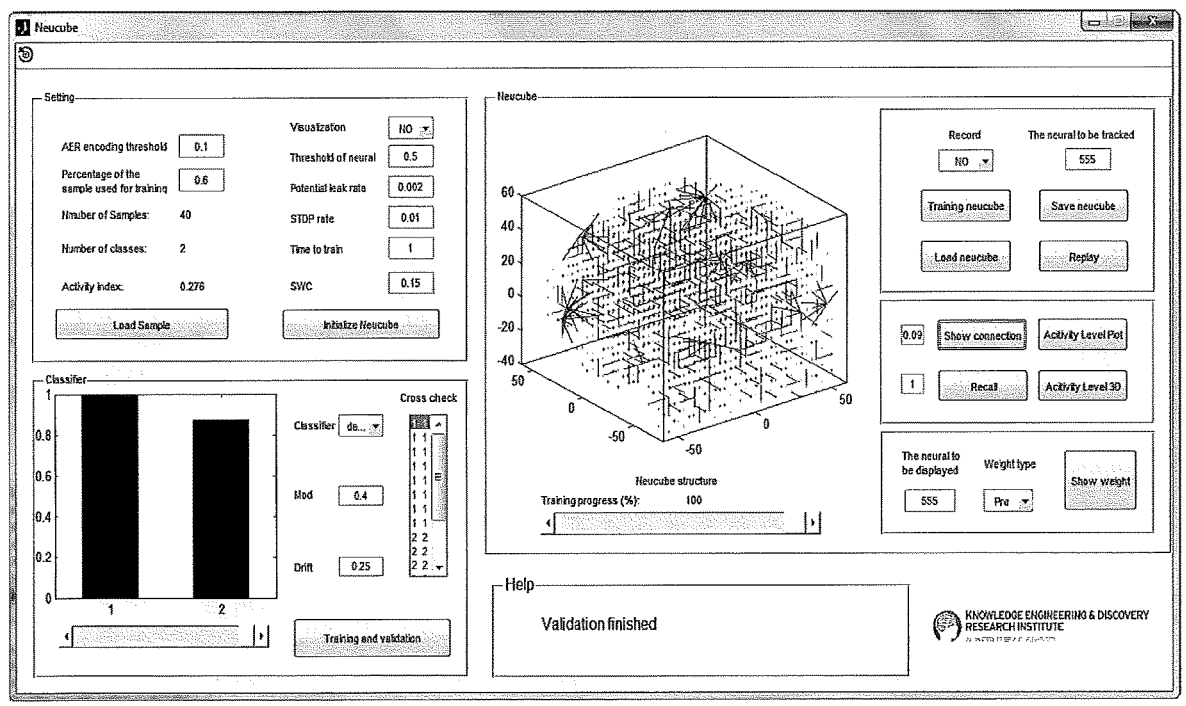
FIG. 6 illustrates graphs showing a dynamic (temporal) variable—the wind speed, over the 60 days before stroke for several patients of age 60 and 68 belonging to the selected subset of patients. It can be seen that during the 30 days before stroke the changes of the wind speed are more significant than before that period, that may help the model to learn and predict a stroke event.

This invention proposes a method and a system for early stroke event prediction based on SSTD. One implementation is illustrated on FIG. 6 where a snapshot of a system is shown.

The proposed method for stroke occurrence prediction based on the invented PMeSNNr is the following:

For a new individual, select the nearest neighbour individuals from the data repository using static data (geographic region, age, gender, history of hypertension, smoking status).

Create and optimise a PMeSNNr for this individual using the temporal weather data of the nearest individuals as 'stroke' and 'control' samples as explained below. Apply the temporal variable input mapping method into the 3D reservoir as proposed above in this specification.

Recall continuously the model on the individual climate data with a sliding window of 1 day. If an output neuron, that is trained in the eSNN classifier to recognise the class 'stroke' is activated, this indicates a risk for a stroke for this person and the number days ahead of the most probable day to happen can be estimated.

A Case Study on Stroke Occurrence Prediction

To illustrate the above method the following case study experiments have been implemented.

The dataset consists of 11,453 samples (all with first ever occurrence of stroke) from six population regions: Auckland (NZ), Perth and Melbourne (Australia), Oxfordshire (UK), Dijon (France), Norrbotten and Vasterbotten counties (Northern Sweden). These study areas are grouped into the Southern Hemisphere region (Auckland, Perth, and Melbourne) and Northern Hemisphere region (Oxfordshire, Dijon, Norrotten and Vasterbotten counties). For this study only the Auckland region with 2805 samples was selected. Patients' medical data comprise only static and categorical data that was recorded after they were hospitalized. There was no temporal recording of patient biological data until the point they had a stroke. Without the temporal medical data, predicting future stroke occurrence is difficult. Therefore, for other available temporal data such environmental data may influence stroke occurrences were utilized to construct this model.

In our previously published case study on stroke occurrences the dataset consisted of 40 samples taken from the Auckland in the autumn season, only including those aged from 60 to 69, with a history of hypertension and smoking at the time of the stroke. Each sample is described by 9 features/variables (4 static patient features and 5 temporal weather features). These temporal variables are temperature (° Celsius), humidity (%), atmospheric pressure (hPA), wind speed (Knots) and wind chills (° Celsius). The weather reading of 60 days before the stroke event is collected to form the experimental data. As mentioned in our previous paper, the absence of healthy subjects, leads to the application of the case-crossover design method. Therefore, each participant acts as both 'case' and 'control' at different time intervals.

The age group of patients is between 50 to 69 years that have a history of hypertension and are currently smokers at the time of stroke. As formerly practiced, the case over design is applied to create normal/control group from stroke patient data resulting to 20 samples altogether. In addition, a new set of temporal data are also collected including new weather variables, air pollution variables and geomagnetic activity variables. The environmental variables were measured over a 60 day period preceding the day of the stroke (excluding the day of stroke itself). The complete list contains a total of eighteen (18) features which consist of six (6) patient static features (categorical data); age, gender, history of hypertension, smoking status, season, date of stroke; along with twelve (12) environmental (temporal) features (continuous daily data) including eight (8) daily mean weather data; wind speed (Knots), wind chill (Degree), temperature dry (° Celsius), temperature wet (° Celsius), temperature max (° Celsius), temperature min (° Celsius), humidity (%), atmospheric pressure in hectopascals (hPA); three (3) daily mean air pollution data; sulfur dioxide ($SO_2$) (μg/m3), nitrogen dioxide ($NO_2$) (μg/m3), ozone ($O_3$) (μg/m3); one (1) planetary geomagnetic activity, as measured by daily averaged Ap indices; solar radiation (Ap Index).

Figure 18:
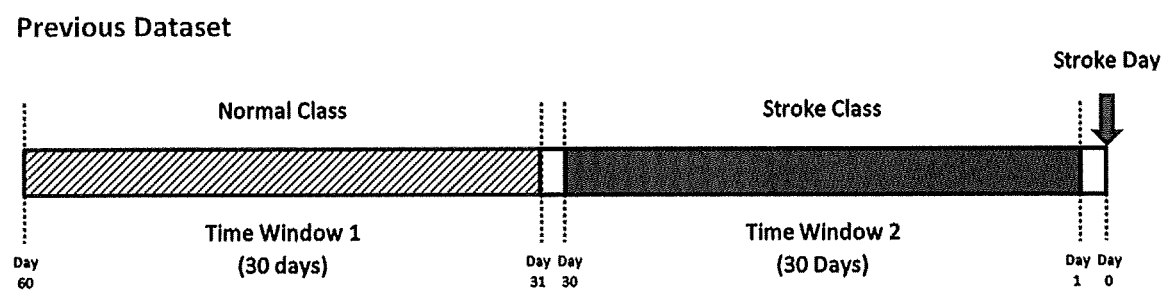
FIG. 18 illustrates time windows to distinguish stroke and normal patients in a data set according to an embodiment of the invention.

In order to distinguish between normal subjects (class 1) and stroke subjects (class 2), only temporal variables will be modeled and analyzed. Each class is represented by temporal data taken from two time windows of 30 days each (refer to FIG. 18). The period spanning 30 days prestroke occurrence until the day before the stroke event is considered as the stroke group (time window 2). We assume this as the critical time window potentially contributing to the risk of stroke. For the same subjects, the period spanning another 30 days from day 31-60 pre-stroke occurrence is taken as the normal/control group (time window 1), due to the assumption that weather parameters 60 days prior have no influence on the actual stroke event. However this appears to be an improper approach to divide the classes since the environment gradually changed overtime. Thus the exact time point when the changes in environments influence the stroke event is unclear. We suggest a transition period between normal and stroke classes, as we believe the transition period consists of ambiguous information that potentially contributes to misclassification or error.

Figure 19:
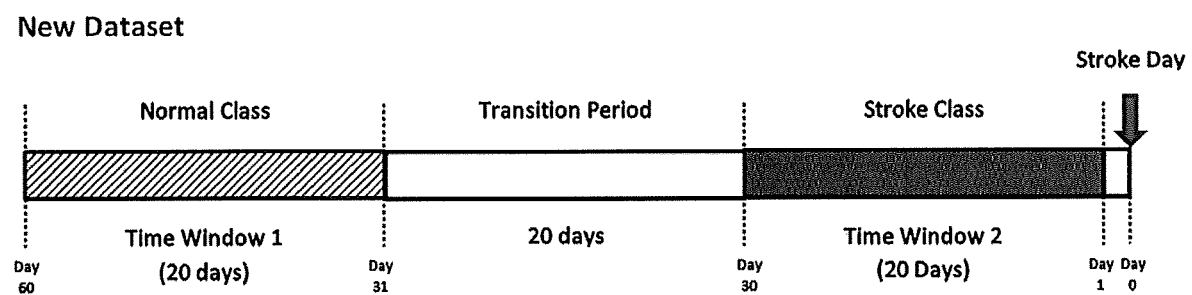
FIG. 19 illustrates time windows to distinguish stroke and normal patients eliminating a transition period in a data set according to an embodiment of the invention.

Consequently, a new experimental dataset is designed by taking out the transition period from the experimental data. The transition period is between the two time windows and was decided that the time length is the same for each time window. Since the temporal environmental data that we have collected is for a 60 day time period, we consider the period spanning 20 days pre-stroke occurrence (time window 2) as 'stroke' class and the last 20 days (time window 1) as 'normal/control' class, eliminating the middle 20 days as a transition period between the time windows (refer to FIG. 19).

Figure 20:
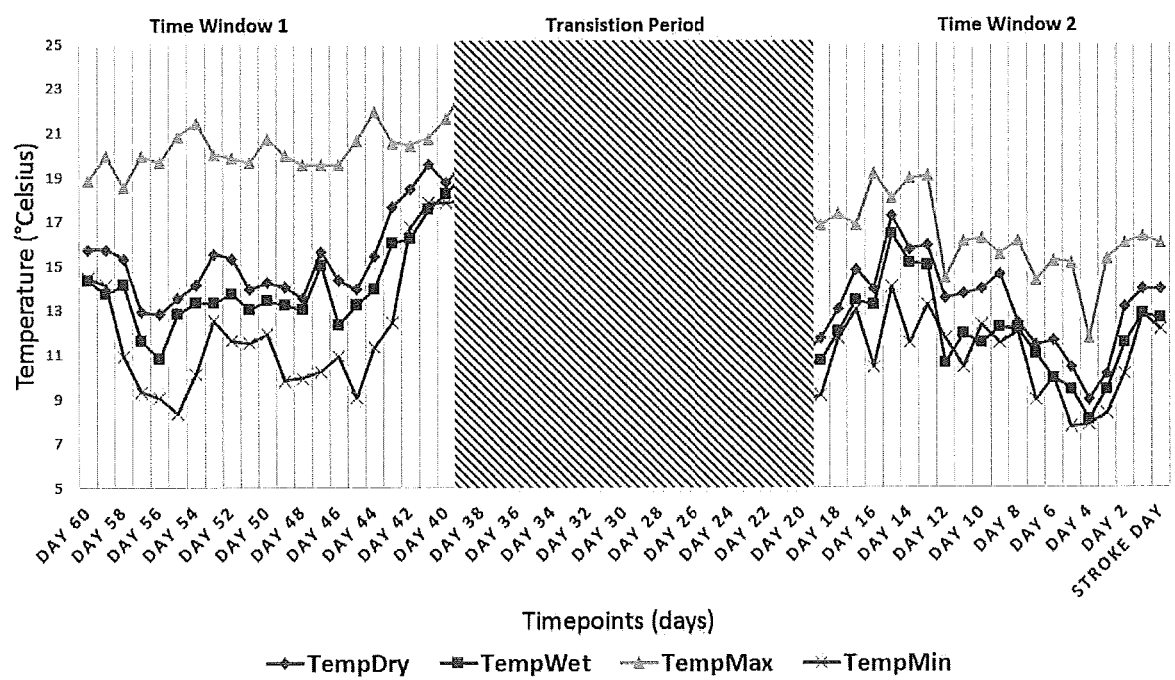
FIG. 20 is a graph illustrating four types of temperature reading in a sample used in an embodiment of the invention.

FIG. 20 depicts the four types of temperature readings for a male subject age 51 over the period of 60 days before the stroke event. The temperature readings were temperature max, temperature min, temperature dry and temperature wet. The variable pattern between time window 1 (20 days pre-stroke event) and time window 2 shows a significant difference, where in time window 2 the temperature readings are relatively chaotic compared to time window 1 and within time window 2 the reading shows several drastic drops in temperature.

Figure 21:
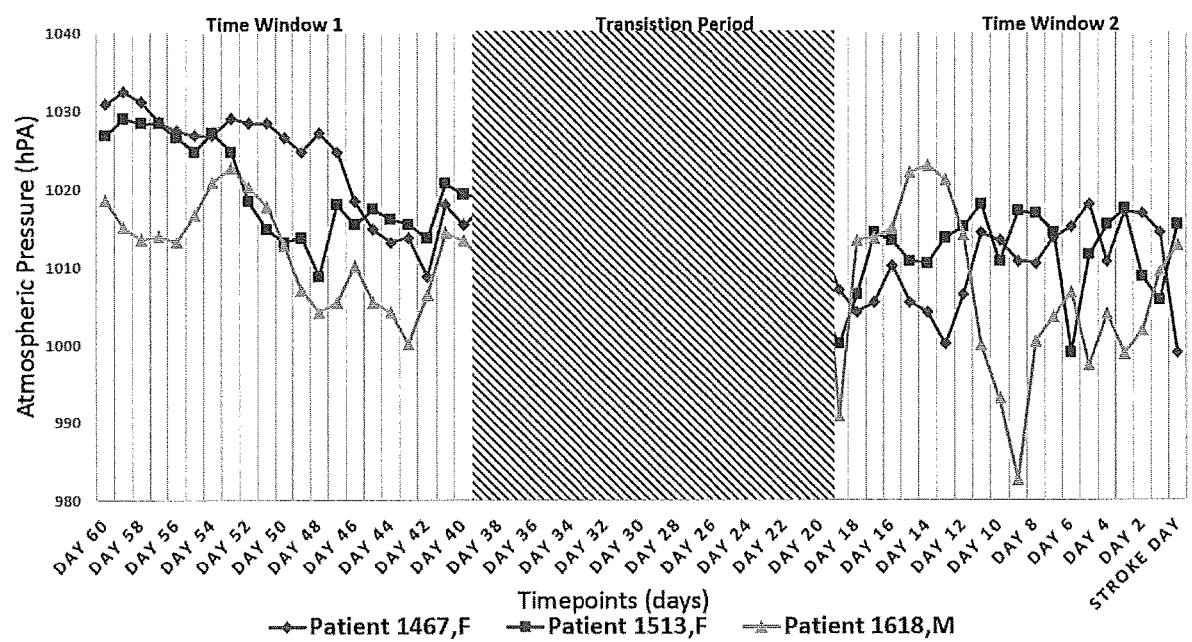
FIG. 21 is a graph illustrating atmospheric pressure readings in a sample used in an application of an embodiment of the invention.
Figure 22:
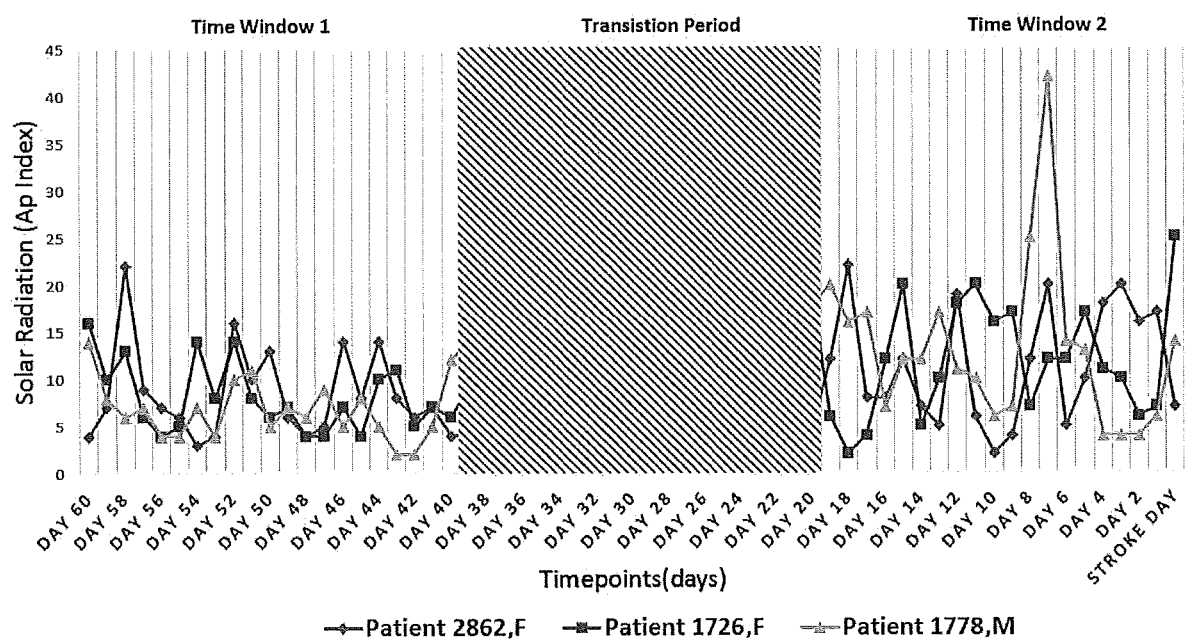
FIG. 22 is a graph illustrating solar radiation readings in a sample used in an application of an embodiment of the invention.

FIG. 21 depicts the atmospheric pressure reading for several patients who were 60 years old. The atmospheric pressure clearly dropping within the period of 20 days (time window 2) preceding stroke compared to the earlier 20 days (time window 1). Moreover, the readings are highly variable in that 20 day period before stroke with several drastic drops for all patients. FIG. 22 shows solar radiation readings for different patients which illustrated that the patients were exposed to high solar radiation before the stroke. The exposure to solar radiation overtime may have effects on human health. As confirmed by several researchers prolonged exposure could lead to skin cancer, eye disease and decrease in the efficiency of the immune system and may increase the risk of cardiovascular disease.

Figure 23:
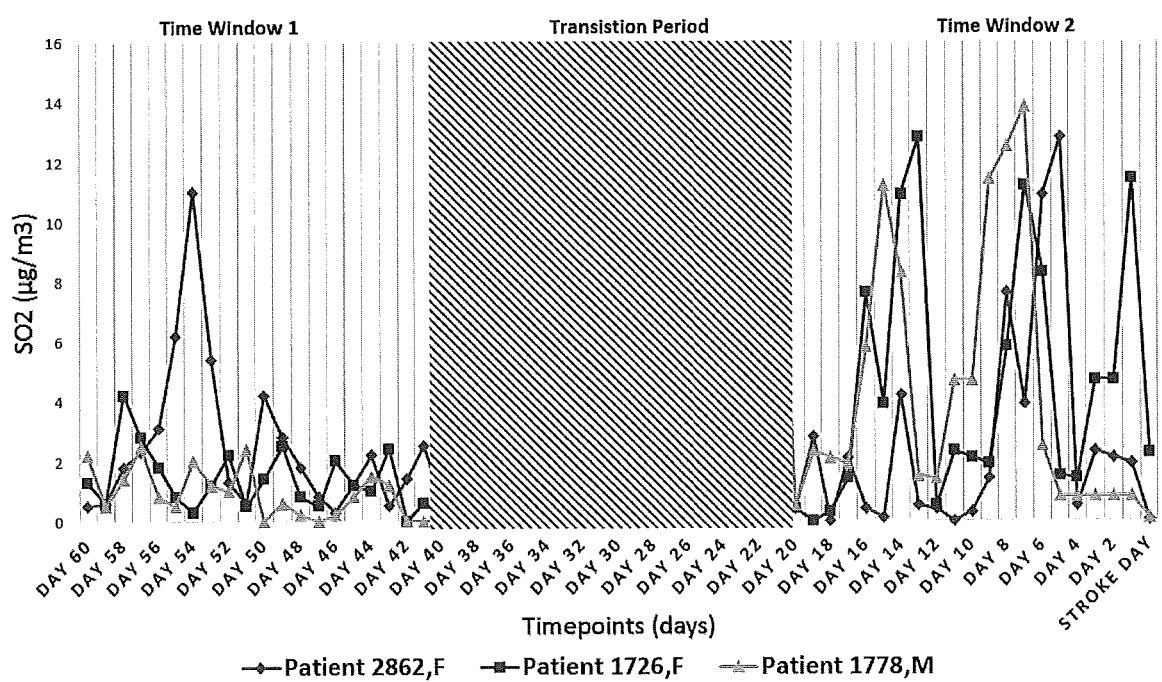
FIG. 23 is a graph illustrating SO2 readings in a sample used in an application of an embodiment of the invention.

From the three types of air pollutant variables, $SO_2$ is illustrated in FIG. 23. $SO_2$ is one of highly reactive gasses known as "oxides of sulfur". These particles penetrate deeply into sensitive parts of the lungs and can cause or worsen respiratory disease, and can aggravate existing heart disease, leading to increased hospital admissions and premature death. The graphical representation of three subjects shows increased exposure to $SO_2$ in time window 2 compared to the exposure during time window 1. This possibly will further clarify our assumption that $SO_2$ in combination with other variables increases the risk of stroke.

Figure 24:
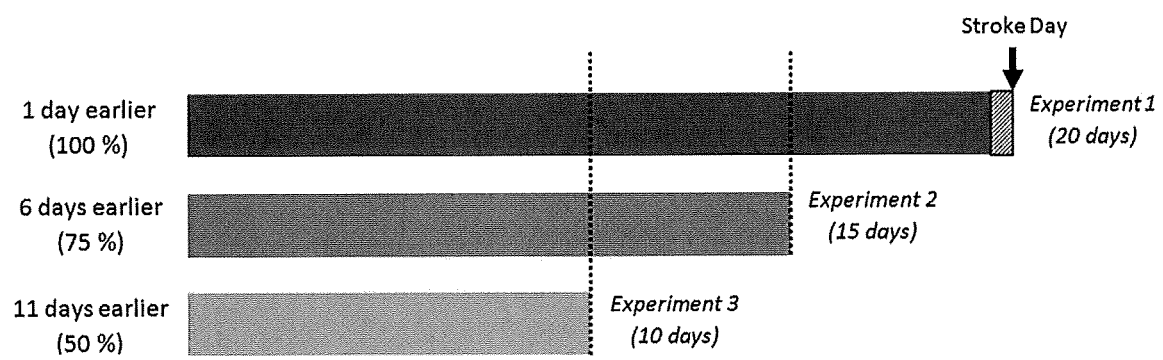
FIG. 24 is a graph illustrating time periods used in an application of an embodiment of the invention.

A new experimental setting (refer to FIG. 24) was designed to assess the feasibility of the p as well as finding the earliest time point to best predict future stroke occurrences in an individual. These experiments are also compared with several standard machine learning algorithms such as SVM and MLP and classical personalized modeling algorithms (kNN and wkNN). A cross validation technique Leave-One-Out Cross Validation (LOOCV) is used for analyzing the accuracy of the prediction. Through this technique the model is trained on all data except one sample and a prediction is made for that sample at the specified prediction date. As depicted in FIG. 24, the first experiment, takes the whole time period covering 20 days (prediction of only one day before stroke occurs). Each time period describes all features related to each time point. For example, for day 5 all the features related to day 5 will be processed as one spike pattern for that particular time point, thus preserving the temporal relationship. Whereas the second experiment looks at 75% of the whole pattern which means the prediction will be 6 days ahead. Lastly, the third experiment will take only 50% (11 days earlier) of the whole pattern to predict the stroke event. The normal class will be referred as Class 1 and stroke class as Class 2.

The following parameter values were selected for optimal classification accuracy:

1) The size of the PMeSNNr reservoir is 6×6×6 making a total of 216 neurons;
2) Threshold for the AER depends on the input data as the input data is not normalized to minimize error or loss of information;
3) Small World Connectivity (SWC) used to initialize the connections in the SNN reservoir, with a radius of initial connections of 0.30. The initial connections are generated probabilistically, so that closer neurons are more likely to be connected;
4) Threshold of the LIFM neurons in the SNN reservoir is 0.5;
5) The leak parameter of the LIFM neurons is 0.002;
6) STDP learning rate is 0.01;
7) Number of training is 2 times;
8) Mod parameter of the deSNN classifier is 0.04 and the drift is 0.25.

Figure 25:
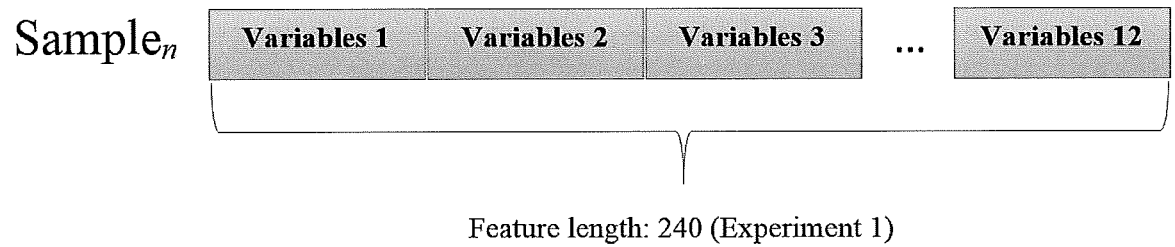
FIG. 25 is a graph illustrating experimental design of conventional machine learning methods.

Since conventional methods are limited to classifying static and vector-based data, the data was arranged in one vector for each experimental setting. The temporal variables for each sample were concatenated one after another, as shown in FIG. 25. Experiment 1 will take all time points for 20 days resulting 240 temporal features for each sample. Experiment 2, takes only 75% of the time length (15 days) giving 180 temporal features for each sample; and experiment 3 takes 50% of the time length which yielding 120 temporal features for each sample.

All experiments are executed using LOOCV techniques without feature selection applied to the dataset. The SVM method used a Polynomial Kernel of first degree. The MLP method used 20 hidden nodes and one output, with learning rates of 0.01 and 500 iterations while kNN and wkNN used a k value of 5.

The obtained best accuracy of the PMeSNNr with the parameter values described above is 95% (100% for the TP—stroke prediction, class 2; 90% for the TN—no stroke—class 1) using Leave-One Cross Validation (LOOCV). Table I below lists the overall accuracy from all experiments.

TABLE I

COMPARATIVE EXPERIMENTAL RESULTS FOR ALL MODELLING METHODS

| | Overall Accuracy (%) | | | | |
|---|---|---|---|---|---|
| Methods | SVM | MLP | kNN | wkNN | Neu Cube$^{ST}$ |
| 1 day earlier (100%) | 55 (70, 40)[a] | 30 (50, 10) | 40 (50, 30) | 50 (70, 30) | 95 (90, 100) |
| 6 days earlier (75%) | 50 (70, 30) | 25 (20, 30) | 40 (60, 20) | 40 (60, 20) | 70 (70, 70) |
| 11 days earlier (50%) | 50 (50, 50) | 25 (30, 20) | 45 (60, 30) | 45 (60, 30) | 70 (70, 70) |

[a](class 1, class 2) accuracy for each class in percentage

The result clearly shows the PMeSNNr method is much more applicable to model such complex data, because without filtering any noise from the data the result is improved over the other conventional methods. This proves that noise also carries valuable information in defining meaningful associations among SSTD. Other conventional methods are susceptible to noise, resulting to lower accuracy if no feature selection method is applied. Furthermore, the conventional methods are clearly not suitable for analyzing complex problems that integrate different types of data because their capability is limited to learn static and vector-based data with no consideration of spatial or temporal relationships.

Analyzing the result further shows that misclassification for class 1 (stroke) is very high for conventional machine learning methods. Among the conventional methods SVM performed better than the rest because of a higher correct classification for the normal class. SVM has a reputation for performing better than other global modeling methods. As for MLP, the performance is as expected since MLP is rather slow and needs many iterations for training. kNN and wkNN also did not perform well and is limited by the value of k.

The PMeSNNr method and system offer a much accurate prediction than other conventional methods. Based on this prediction, individual may takes steps to reduce the risk of stroke such as protecting themselves from hazardous environmental conditions. This stroke prediction tool has the potential to enhance the capacity of existing stroke prediction by allowing more individualized risk prediction and for earlier time points than currently possible.

Figure 26:
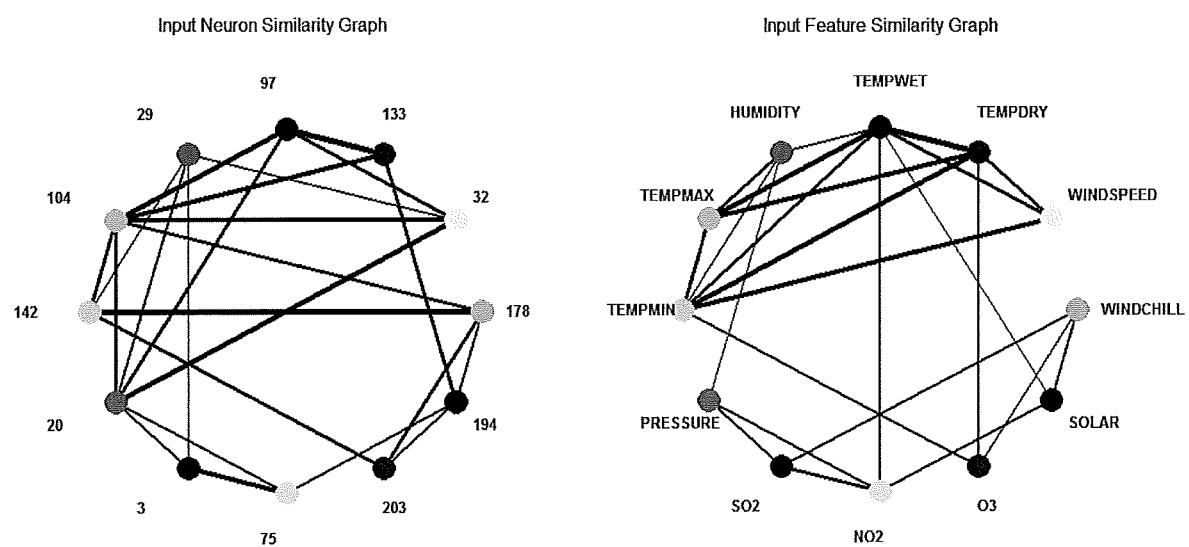
FIG. 26 is an illustration of input neuron similarity according to an application of an embodiment of the invention.

This study not only aimed to improve prediction accuracy, but also aimed to aid the discovery of new knowledge. Most conventional machine learning algorithms are black box methods where the learning within is not visualized. This system visualizes the learning process and through these visualization functions, relationships that reside within SSTD can be comprehended. FIG. 26 depicts the best input neuron similarity graph generated to approximately match input feature similarity graph. The spike density of the signals is calculated to produce the input feature similarity graph. Then the input neuron similarity graph is produced to show where input neurons are mapped inside the recurrent 3D reservoir.

Analyzing this input feature similarity graph further, the correlations between temperature variables are very strong. So mapping these temperature variables to input neurons in close proximity is vital for better learning of the SSTD patterns. This mapping produced the highest prediction accuracy (95%), suggesting that temperature variables may have a strong influence in predicting stroke occurrences. This data was taken in winter season where temperature readings are quite low on several days, supporting most research done in the past on low temperature as a trigger of stroke occurrence. In the input neuron similarity graph, we can recognize that there is a strong correlation between two air pollutant variables, SO2 and NO2; and a connection between NO2 and solar radiation. One study has uncovered that NO2 gas plays an important role is solar radiation absorption under polluted conditions.

Figure 27:
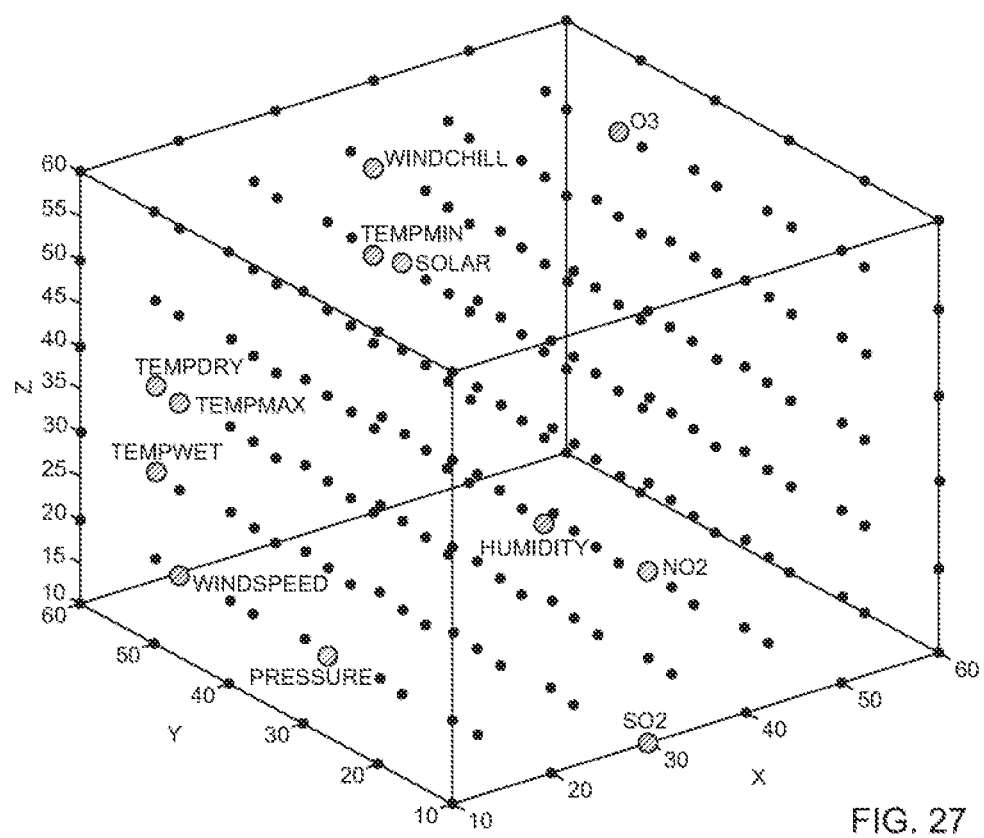
FIG. 27 is an illustration of weather variables according to an application of an embodiment of the invention.
Figure 28:
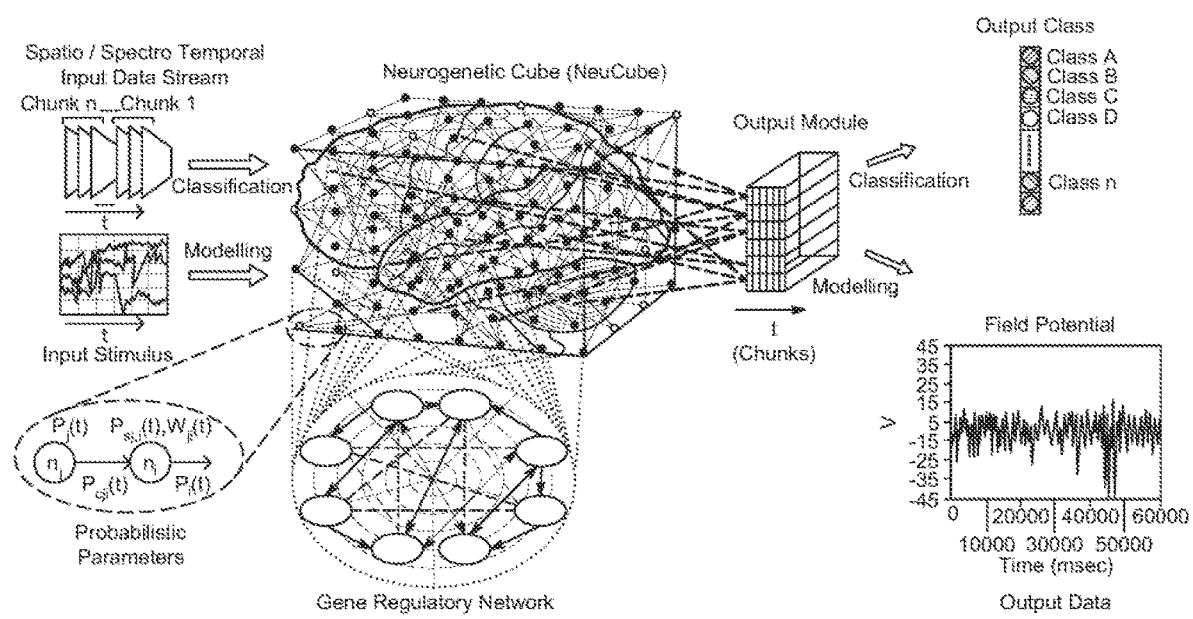
FIG. 28 is a block diagram of architecture according to an embodiment of the invention.

Analyzing the current problem in a smaller size reservoir produces better and stable results. The total number of neurons used to model this problem is only 216 which mean the closer the input neurons are to each other the better the learning process and the input neurons also mapped to all faces of the cube. As illustrated in FIG. 27, all weather variables are mapped close to each other. Air pollution variables were mapped closely to each other with the exception of O3 which had a stronger association with wind chill and temperature min readings.

Figure 7:
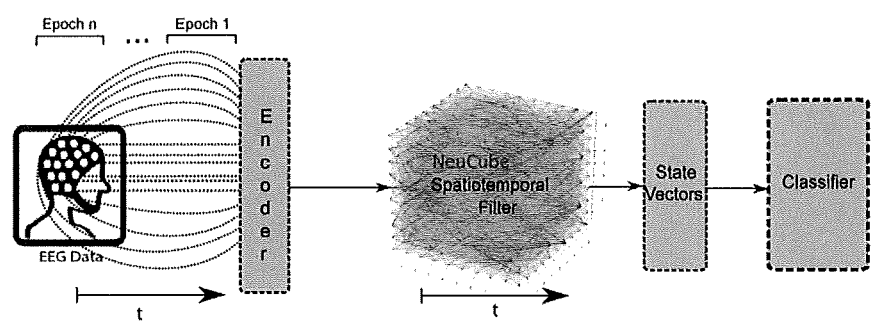
FIG. 7 is a block diagram of a system for classifying electroencephalography spatio/spectro-temporal data according to an embodiment of the invention.
Figure 43:
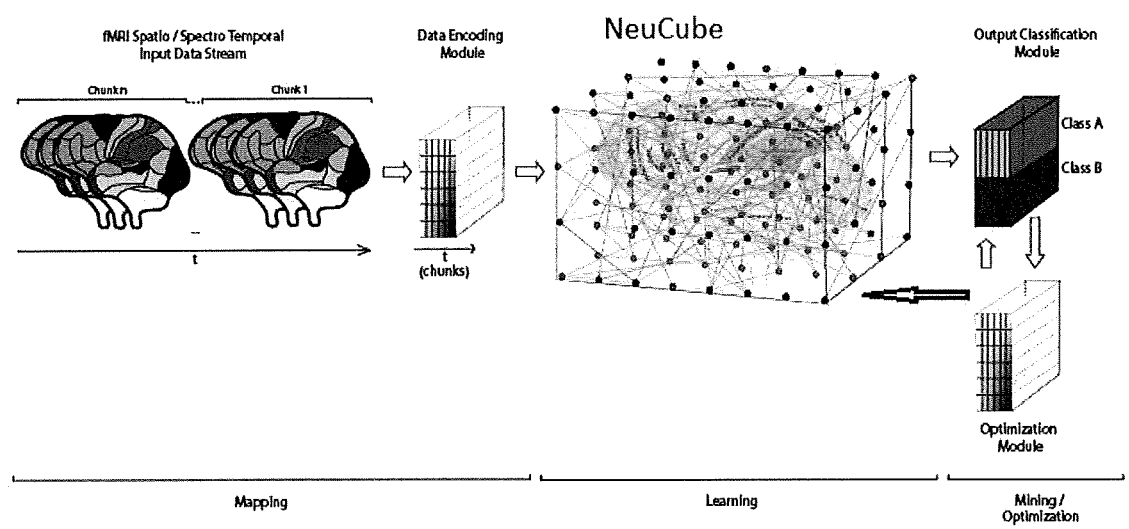
FIG. 43 is an illustration of mapping fMRI spatio-temporal brain data for modelling, classification or prediction.

Method and System for Brain Data Mapping and Modelling Based on the Invention and its Use for Personalised Brain Computer Interfaces FIG. 7 illustrates an exemplary method for EEG SSTD (now denoted as spatio-temporal brain data (STBD)) classification, and is presented here based on the above described particular embodiment of the invention. It implements the system from FIG. 2 but here, instead of PMeSNNr, a system called NeuCube (Neurogenetic Cube) according to FIG. 7 is used. The exemplary method comprises:

1. EEG signals collected from EEG channels are encoded into trains of spikes using some of the encoding methods, e.g. the Address Event Representation (AER) method.
2. The spike trains are entered into a reservoir SNNr with N spiking neurons after a mapping/allocation of the input variables is defined according to the proposed method here.
3. The principle of the brain data mapping method is that the 3D SNN reservoir represents a brain structure where each spiking neuron corresponds to a small area of a 3D brain template (e.g. Talairach; MNI etc.). For example at a resolution of 1 $cm^3$ there will be 1471 neurons used in the SNN reservoir, while if the resolution is 1 $mm^3$ the number of the neurons will be approximately 2.5 min. The size of the SNNr will depend on the STBD (e.g. EEG, fMRI, DTI, structural brain data etc.) for the modelling and prediction task.
4. In one particular implementation of the above mapping method for EEG data mapping, the EEG channels are mapped into the Talairach template coordinates as suggested in [34] and illustrated by way of example in Appendix 1. The 3D coordinates of the neurons in the SNNr will correspond to the Talairach coordinates [35] so that any EEG or other brain data can be mapped into the 3D SNNr and not only for one, but for many subjects. The Talairach template of coordinates can be also obtained through transformation from other brain templates as the MNI that are currently used to map brain data such as EEG, fMRI, MEG.
5. In another implementation of the proposed method fMRI (functional magnetic resonance images) voxel variables are mapped into a 3D SNN reservoir, so that the 3D coordinates of each voxel corresponds to the coordinates of a corresponding neuron in the SNNr where this voxel temporal data is entered for learning in the SNNr; FIG. 43 shows a schematic diagram of such case.
6. In another implementation of the method, fMRI 3D voxel coordinates are transformed into Talairach 3D coordinates before the voxel input variables are mapped into the SNNr;
7. In one implementation, all N neurons of the 3D SNNr are connected to neurons in the output classification module and spiking activity patterns of the SNNr are continuously passed as input information to the classifier. In one implementation, as a classifier we use deSNN [29].
8. EEG STBD is learned in the 3D SNNr in an unsupervised mode using the STDP learning rule.
9. After that the training EEG STBD is propagated again and a classifier is trained in a supervised mode to recognise labelled patterns from the SNNr.
10. The system is tested on test EEG STBD.
11. If necessary, parameters are optimised for a better performance
12. The system is analysed for a better EEG STBD understanding and new knowledge discovery.

Figure 8:
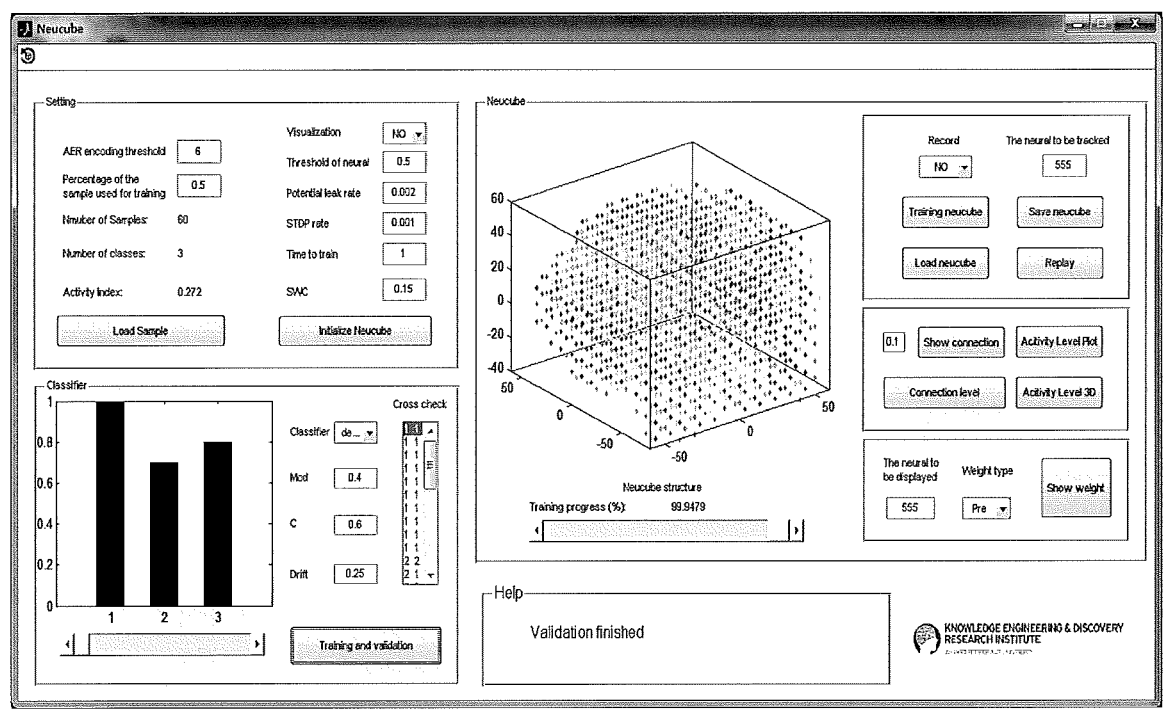
FIG. 8 is a screen shot displaying an exemplary implementation of a NeuCube system for electroencephalography data analysis according to an embodiment of the invention.

FIG. 8 is a screen shot displaying an exemplary implementation of a NeuCube system for EEG (electroencephalography) data analysis according to an embodiment of the invention.

Figure 9:
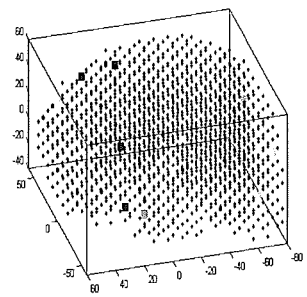
FIG. 9 illustrates visualisations of connectivity and spiking activity of an evolving spiking neural network personalized model according to an embodiment of the invention.
Figure 9:
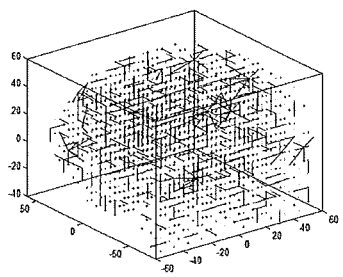
Figure 9:
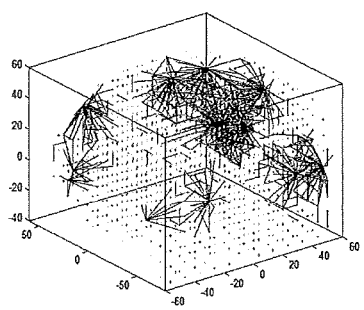

As an illustration, FIG. 9 shows the spiking activity (a) and connectivity of a SNNr of N=1471 neurons trained on EEG STBD collected through 14 channel EEG wireless headset (Emotiv [36]) before training—(b) and after training—(c). It can be seen that as a result of training, new connections have been created that represent spatio-temporal interaction between EEG channels captured from the data. The connectivity can be dynamically visualised for every new pattern submitted.

Figure 10:
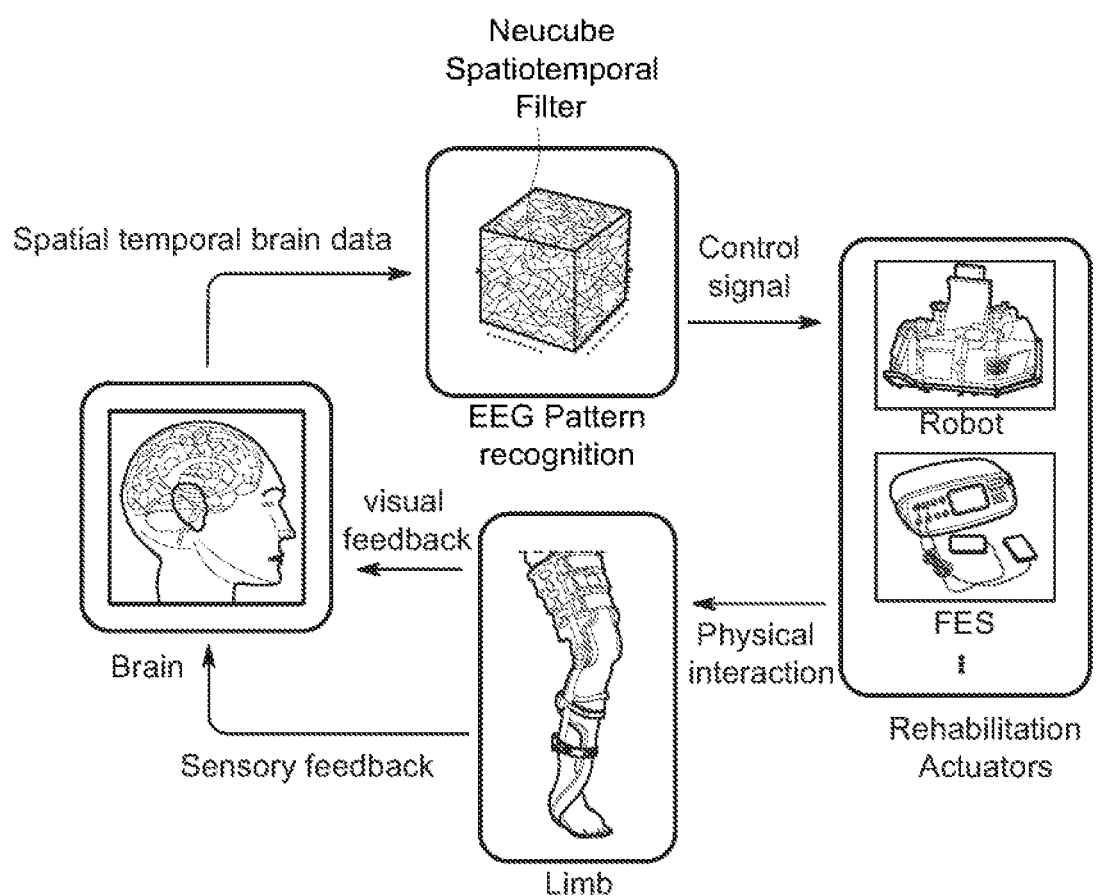
FIG. 10 is a block diagram of a brain-controlled neurorehabilitation robotic system according to an embodiment of the invention.

Method and System for Personalised Brain-Controlled Neuro-Rehabilitation Robots Based on the Invention Neurorehabilitation cognitive robotics is a growing area of science and technology with different methods and systems being utilized for different purposes. Some embodiments of the present invention can deal with brain-controlled neurorehabilitation robots, sometimes referred to as rehabilitation actuators. Brain signals, collected from a patient or from a control subject, are used to train a learning system to control part of the body of the patient, damaged due to a stroke, traumatic brain injury or spinal cord injury. After that, the patient's brain signals are used to do the control during rehabilitation. As a result the damaged part of the patient's brain is re-trained to do the control function in a cognitive way which is more efficient when compared to other methods that do not use brain signals and brain activity directly during the rehabilitation process. FIG. 10 shows a principle block diagram of a brain-controlled neurorehabilitation system with the use of the NeuCube from the previous section.

Three 'groupings' of patients are referred to, those who have some muscle activity, but not enough to move efficiently. For this group the approach could be to use the EMG signals as the driver for the movement. The aim on this type of movement would be to enable very clean and precise control of the movement. A second grouping would be those that had intact brains but spinal level, or lower problems (as long as they have a motor nerve to the muscle). These people should be able to start with a trained system based on normal peoples EEG patterns during certain functions. This would reduce the learning time and make rehab faster and more efficient, it would be like a fine tuning set up, rather than a complete learning set up.

A third grouping would be those patients who have impairment in brain function (lesion from stroke, tumor, head injury) for whom a changed pattern of EEG need to be learned for control functions that is likely to be highly personalised. This situation may require a significant amount of time for learning a different neural pathway to eliciting a response from the EMG system.

Figure 11:
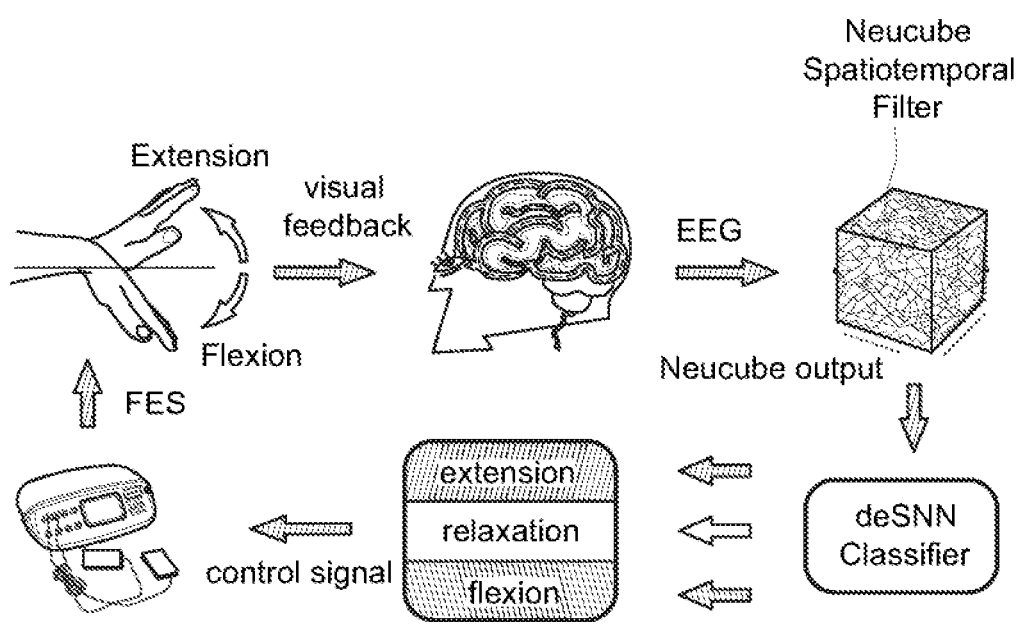
FIG. 11 is a block diagram of a brain-controlled neurorehabilitation robotic system according to another embodiment of the invention.

Brain Controlled Neurorehabilitation Case Study 1: Voluntary FES Control Using NeuCube-Based BCI This case study concerns the application of using NeuCube architecture to classify STDB as the control signal of FES (functional electrical stimulation) therapy. FIG. 11 shows a brain controlled neurorehabilitation robotic system according to an embodiment of the invention. FES involves artificially inducing a current in the specific motor neurons to generate muscle contractions which has shown satisfactory results in movement restoration and neurorehabilitation. In traditional FES therapy, current stimulus with predefined intensity is applied on the limb of paralyzed patients to help them achieve a certain movement. Disregard of patients' voluntary intention in traditional FES therapy has limited the rehabilitation effect since this purely passive process is less likely to inspire patients to be involved. To improve rehabilitation effect, human in loop FES control is introduced, in which the patients' intention will be extracted, and then used to control the FES intensity which determines the induced contraction level of muscles.

FIG. 11 shows a case of human in loop FES control, in which the paralyzed patient lost his control of wrist; FES is applied on the wrist extensor and flexor to help restore the hand movement function. The intention to either extend or flex the wrist is classified by Neucube and deSNN, and then the classification result is used to adjust FES to certain proper intensity so that the desired wrist position can be achieved. Fulfilment of this human in loop FES control totally depends on EEG data classification which is the most critical stage. For a pilot study, EEG data of three classes, i.e. EW (imagine extend wrist), FW (imagine flex wrist) and RP (imagine maintain wrist in natural and relaxed position) were collected and used to train Neucube and deSNN classifier.

EEG data were collected using Emotive, which is a commercial EEG acquisition helmet with 14 channels. A healthy male subject was asked to repeatedly imagine three motions, i.e. EW, FW and RP with his eyes closed to minimize noise signals being generated. Each kind of imagination was repeated for 20 times, and 1 sec for each time. The whole 60 samples were randomly and evenly divided into training group and validation group.

Figure 12:
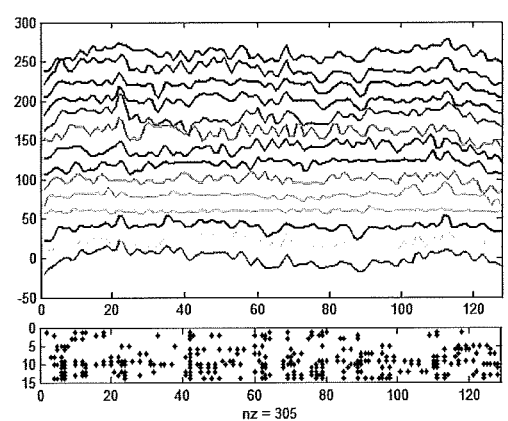
FIG. 12 is a graph illustrating electroencephalography data in a sample according to an embodiment of the invention.

AER algorithm is utilized to encode continuous EEG signal into train of spikes. FIG. 12 shows EEG signals of one sample collected by Emotive and trains of spikes encoded from these signals.

To initialize the connection weights between neurons in the 3D SNNr NeuCube, a small world connection rule was applied. The spatial distance of two neurons was calculated to determine their initial connection weight. The closer the neurons were, the higher connection weight would probably be. 80 percent of connections were initialized to be exhibitory and the other 20 to be inhibitory. FIG. 9b shows the initial connections of NeuCube reservoir before training process was executed. Those dots represent 1471 neurons, and those lines represent the connections between two neurons whose weight was greater than a certain threshold with the colours indicating either these connections were excitatory or inhibitory (blue and red colours correspondingly). FIG. 9c shows the connection state after the training process. Comparison between FIGS. 9b and 9c reveals that the random connections before training became more regular and the connection densities of certain areas were strengthened especially where the input neurons located.

Figure 13:
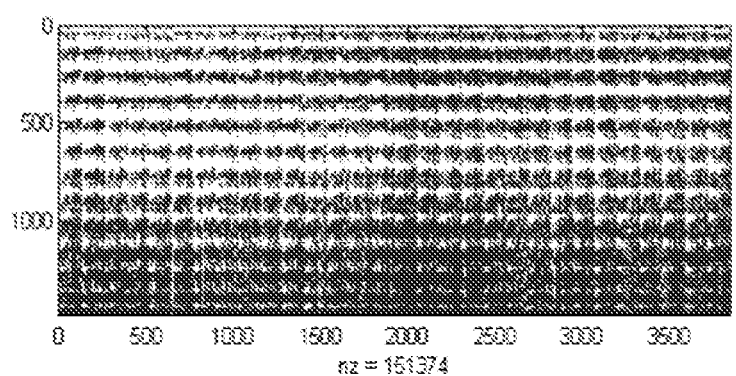
FIG. 13 shows the activation of neurons in a NeuCube reservoir for training samples during a training process according to another embodiment of the invention.

FIG. 13 shows the activation of the 1471 neurons in the NeuCube reservoir for all the training samples during the entre training process.

In the example now discussed, the output of the Neucube reservoir was used to train a deSNN classifier. Training and validation procedure were carried on for 20 times. The average accuracies for imagine EW, RP and FW are 94%, 62% and 71% respectively.

Brain Controlled Neurorehabilitation Case Study 2

Figure 14:
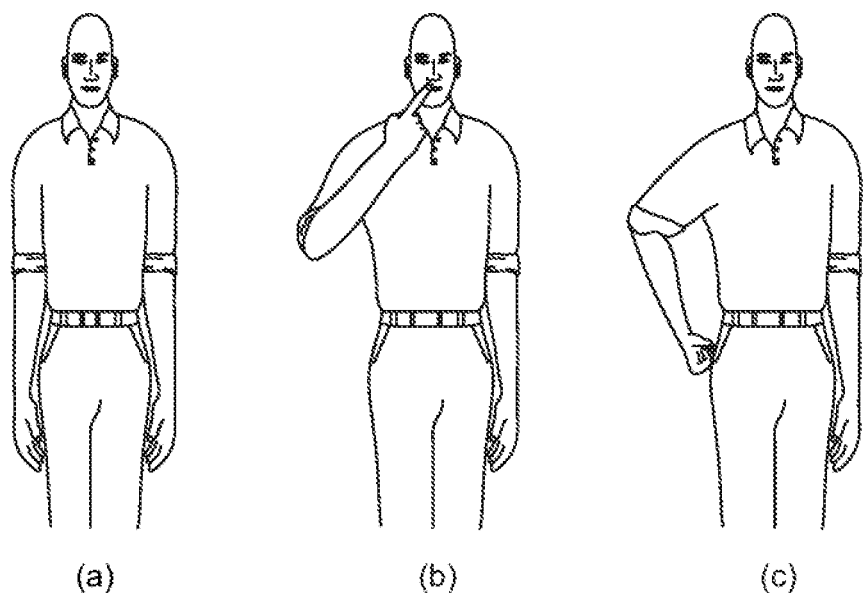
FIG. 14 illustrates exemplary activities used for collecting electroencephalography spatio/spectro-temporal data according to an embodiment of the invention.

The Emotiv equipment used to collect EEG data in this case study had 14 channels with frequency of 128 Hz, i.e. 128 data points are recorded per second for each channel. One healthy male subject was involved in this case study. He was asked to perform three types of activities of daily life with his right upper limb, which were: idle state; eating; and pulling trousers, shown in FIG. 14. Each movement started with the sound reminder 'GO', finished within 1 sec. The EEG data was collected during the process with the time length of 1 sec. During the entire experiment, the subject was asked to repeat each movement for 10 times with eyes closed. Five samples were used to train the NeuCube and the classifier, and the other 5 ones were used for validation.

Figure 15:
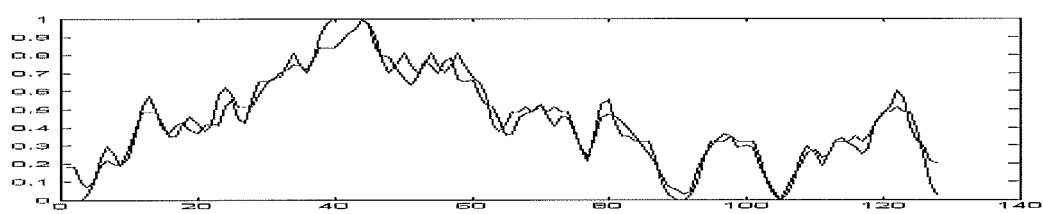
FIG. 15 illustrates graphs showing analysis for electroencephalography spatio/spectro-temporal data according to an embodiment of the invention.
Figure 15:
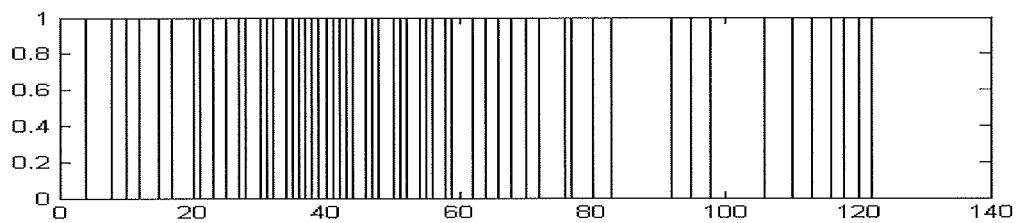

EEG data was encoded into spike trains using BSA encoding method. The estimated EEG and the original signal of certain channel are shown in FIG. 15(a), and the corresponding spike trains are shown in FIG. 15(b). A linear finite impulse response (FIR) filter was used in BSA encoding. The filter size was optimized as 7 and the threshold was selected as 0.679 for the particular EEG data set by trial and error.

Figure 16:
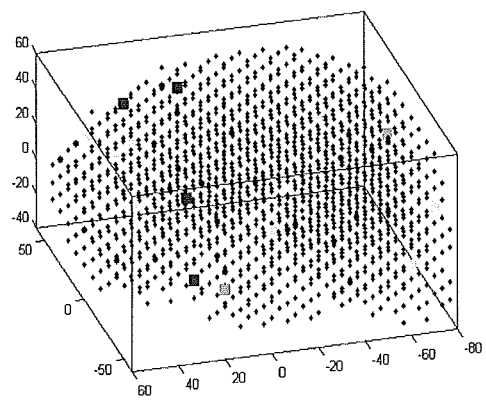
FIG. 16 illustrates a NeuCube visualisation and classification results according to an embodiment of the invention.
Figure 16:
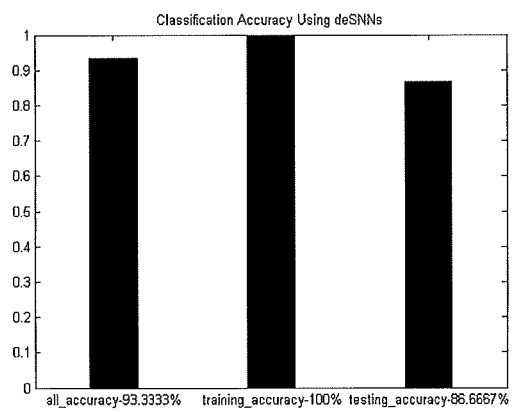

The spike trains of training samples were used to train the NeuCube with STDP learning method. The visualization of the NeuCube is shown in FIG. 16a, where the square markers represent 14-channel input neurons. There are 3 states for input neurons, which are positive spike, negative spike and non-spike represented by magenta, cyan and yellow respectively. The dots represent 1,471 internal neurons which have only 2 states, positive spike and non-spike, represented by red and blue respectively.

The spike trains of all neurons in the NeuCube were used to train a classifier, in this case—deSNNs. The classification results are shown in FIG. 16b. The classification accuracy on all samples-, on the training samples and on the testing samples is 93.33%, 100% and 86.67% respectively.

In some embodiments some or all of the concepts discussed with reference to neurorehabilitation may also be applied to other applications, such as control of an apparatus without a rehabilitation goal.

Brain Controlled Neurorehabilitation Case Study 3

In this case study the PMeSNNr is called NeuCube.

A focal neurological insult that causes changes to cerebral blood flow, such as in a stroke, can result in mild to severe motor dysfunctions on the contralateral side of the body. Although some spontaneous recovery usually occurs in the first 6 months after stroke only about 14% of people with stroke recover normal use of the upper limb The driver of functional recovery after stroke is neural plasticity, the propensity of synapses and neuronal circuits to change in response to experience and demand. Whilst it is known that frequency and intensity of intervention following stroke is important high intensity rehabilitation is resource-limited. In order to deliver interventions at a high enough intensity and frequency for neural plasticity we need to develop devices that can assist with rehabilitation without the concentrated input of rehabilitation professionals.

Motor imagery (MI), or the mental rehearsal of a movement, is an approach used by rehabilitation professionals to encourage motor practice in the absence of sufficient muscle activity MI is thought to activate similar cortical networks as activated in a real movement, including activation of the primary motor cortex, premotor cortex, supplementary motor area and parietal cortices Recent evidence suggests that although there are common cortical networks in real and imagined movement (frontal and parietal sensorimotor cortices) there are also important differences, with ventral areas being activated in imagined movement, but not in real movement. These specific additional activations in the extreme/external capsule may represent an additional cognitive demand of imagery based tasks.

Recovery of movement control is greater after motor execution training than after MI training alone. Interestingly the combination of MI training with even passive movement generates greater recovery than MI alone. Combining motor imagery with functional electrical muscle stimulation, via Brain Computer Interface (BCI) devices, may result in greater neural plasticity and recovery than motor imagery alone, or motor imagery combined with passive movement. The additional feedback to the brain provided by executing a movement may enhance plasticity and reduce the cognitive demand of motor imagery. Many people following stroke or other neurological disorder have some residual muscle activity but fail to recruit enough motor units at an appropriate speed and pattern, to generate sufficient force to complete the desired movement. A BCI device in which motor imagery triggers an appropriate signal to a functional electrical stimulation system would facilitate the practice of real movements and potentially result in greater neural plasticity and functional recovery.

EEG records brain signals through electrodes on the scalp and is the most widely used method for recording brain data used in BCI devices. EEG is non-invasive and has good temporal and spatial resolution. However, EEG systems have been criticized because of the time consuming and complex training period for the potential user One advantage of the NeuCube framework is that intensive training of the user is not required as NeuCube classifies naturally elicited cortical activity, rather than a specific component of the EEG signal, such as the P300 wave, the production of which has to be learned by the user. In addition, the NeuCube is capable of learning in an on-line fashion, training as it is used.

We are investigating the feasibility of using NeuCube with EEG data to develop a functional electrical stimulation BCI system that is able to assist in the rehabilitation of complex upper limb movements. Two methods of use are under consideration, firstly for people who have no voluntary activity in a limb who would drive the device using MI, and secondly for people who have some residual activity in their muscles that, in addition to using MI, may augment the device with their own muscle activity. To do this it is important to establish a high degree of accuracy of classification of movement intention and movement execution to ensure that the appropriate electrical stimulation output is then provided. One of the challenges to any BCI system is the extent to which it accurately classifies the input signal.

The specific hypothesis for this cases study was that the NeuCube would accurately classify both single joint real and imagined movements of the hand into one of three classes, flexion, extension or rest. A secondary hypothesis was that the NeuCube would perform better than other classification methods, including Multiple Linear Regression (MLR), Support Vector Machine (SVM), Multilayer Perceptron (MLP) and Evolving Clustering Method (ECM), along with offering other advantages such as adaptability to new data on-line and interpretability of results.

Three healthy volunteers from our laboratory group participated in the study. None had any history of neurological disorders and all were right handed.

All measures were taken in a quiet room with participants seated in a dining chair. The task consisted of either performing the specified movements or imagining the movements, or remaining at rest. All tasks were completed with eyes closed to reduce visual and blink related artifacts. The movement execution task involved the participant resting, flexing the wrist or extending the wrist. The starting position was from midpronation with the forearm resting on the persons lap. The movement intention task involved the participant imagining or performing the movements as described above. Participants were required to imagine or perform each movement in 2 seconds and to repeat that 10 times.

A low-cost commercially available wireless Emotiv Epoc EEG Neuroheadset was used to record EEG data. The Epoc records from 14 channels based on International 10-20 locations (AF3, F7, F3, FC5, T7, P7, O1, O2, P8, T8, FC6, F4, F8, AF4). Two additional electrodes (P3, P4) were used as reference. Data were digitized at 128 Hz sampling rate and sent to the computer via Bluetooth. An important factor was that no filtering was applied to the data, either online or offline.

The data was separated into classes denoting each task. Each set of ten samples was then evenly divided into a training (seen) and a testing (unseen) set. The data was then converted into trains of spikes (one train per channel, 14 in total) with the Address Event Representation algorithm, utilizing a spiking threshold of 6. No other data processing was applied.

Each training sample was presented to the NeuCube once, entered as 14 input streams of EEG continuous data collected at the msec time unit, encoded using AER with a step size of 6. The spiking activity of every neuron was recorded over the time of the sample, and these presented to the deSNNs classifier. The deSNNs was initialized with a Mod of 0.9 and drift factor of 0.25 (empirically established values for this dataset). The synaptic weights for both the NeuCube and the deSNNs were then fixed at their final (learned) values for the validation phase. The unseen data samples were presented in the same way, and the predicted classes recorded. The predicted classes were then compared to the actual classes of those samples.

The NeuCube described above was compared to some popular machine learning methods: MLR, SVM, MLP and ECM. The SVM method uses a Polynomial kernel with a rank 1; the MLP uses 30 hidden nodes with 1000 iterations for training. The ECM (Kasabov and Song, 2002) uses m=3; Rmax=1; Rmin=0.1. Data for these methods is averaged at 8 msec intervals and a single input vector is formed for each session, as is general practice.

The classification accuracy of the NeuCube was on average 76%, with individual accuracies ranging from 70-85%. There was a consistent rate of recognition between the real and the imagined movement. In terms of the comparison with other classification approaches, it is clear from the results shown in Table 1 below that the NeuCube performed significantly better than the other machine learning techniques with the highest average accuracy over all subjects and samples, whilst the closest competitor was SVM with the second highest average accuracy of 62%. MLR was the poorest performing, with an average accuracy of 50.5%, or just over the chance threshold.

TABLE I

RESULTS OF THE COMPARATIVE STUDY; ACCURACY EXPRESSED AS PERCENTAGE FOR REAL AND IMAGINED MOVEMENTS.

| Subject/Session | MLR | SVM | MLP | ECM | NeuCube |
| --- | --- | --- | --- | --- | --- |
| 1-Real | 55 | 69 | 62 | 76 | 80 |
| 1-Imagined | 63 | 68 | 58 | 58 | 80 |
| 2-Real | 55 | 55 | 45 | 52 | 67 |
| 2-Imagined | 42 | 63 | 63 | 79 | 85 |
| 3-Real | 41 | 65 | 41 | 45 | 73 |
| 3-Imagined | 53 | 53 | 63 | 53 | 70 |
| Average (appr.) | 52 | 62 | 55 | 61 | 76 |

In considering the classification accuracies, which ranged from 70-85%, it is important to consider three factors. Firstly, the data were collected in an unshielded room using a commercially available gaming EEG headset, resulting in an EEG signal with relatively high signal to noise ratio. Secondly, there was no processing or feature extraction performed on the data prior to classification, the raw, noisy, EEG data was used as the input. Thirdly, all comparative methods in this study, excepting NeuCube, were validated using Leave-One-Out (all but one sample used for training), while the NeuCube was validated with a more disadvantageous 50/50 (half used for training, half for testing) split. The accuracy of the NeuCube was still significantly higher than the other techniques and would likely rise when trained with leave-one-out paradigms.

Figure 29:
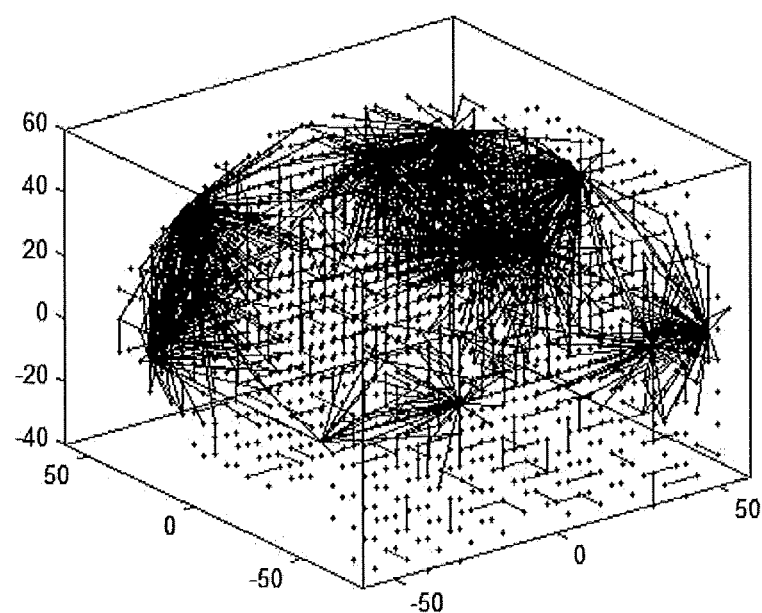
FIG. 29 is an illustration of neuron connections according to an embodiment of the invention.
Figure 30:
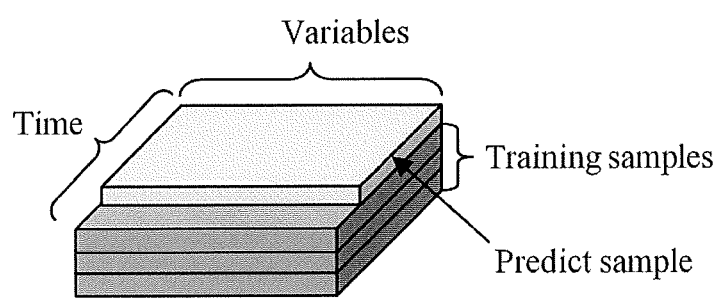
FIG. 30 is a spatio-temporal data model used for early event prediction.
Figure 31:
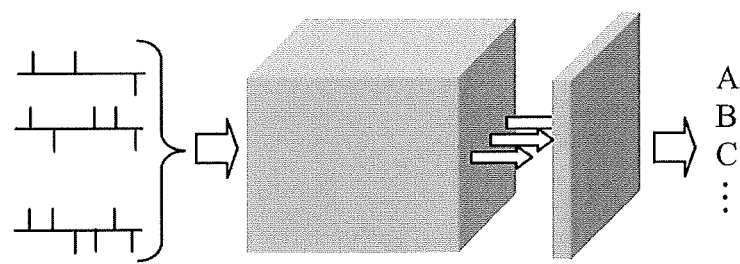
FIG. 31 is a block diagram of architecture according to an embodiment of the invention.
Figure 32:
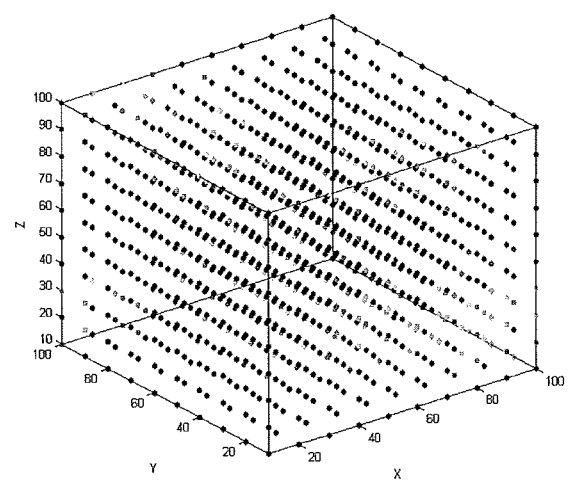
FIG. 32 is an illustration of a spiking neural network reservoir according to an embodiment of the invention.

An advantage of the NeuCube is that it allows for interpretation of results and understanding of the data and the brain processes that generated it. This is illustrated in FIG. 29 where the connectivity of a trained SNNr is shown for further analysis. The SNNr and the deSNN classifier have evolvable structures, i.e. a NeuCube model can be trained further on more data and recalled on new data not necessarily of the same size and feature dimensionality. This allows in theory for a NeuCube to be partially trained on highly accurate data captured in a controlled manner with medical devices, and then further trained and adapted to the particular subject with a cheaper, less accurate device such as the Emotiv. This will increase potential uses in clinical and rehabilitation applications.

A Method for SNNr Analysis and a System Based on the Invention for Early Ecological Event Prediction The proposed method consists of the following steps, where the abbreviation PMeSNNr is replaced by NeuCube:

A. Data Encoding

In real world applications, spatio-temporal data are often collected in the form of real value sequences. Such sequences cannot be readily used by spiking neural networks. So first of all, we need to convert the continuous signal into discrete spike trains. We use the Address Event Representation (AER) encoding method to discretize the continuous signal. Specifically, we perform a bi-direction thresholding to the signal gradient with respect to time, d/dt. The threshold is self-adaptive and is determined in the following way: for a signal f(t), we calculate the mean m and standard deviation s of the gradient df/dt, then the threshold is set to m+αs, where α is a parameter controlling the spiking rate after encoding.

After this, we obtain a positive spike train which encodes the places of the increasing signal and a negative spike train which encodes the places of the decreasing signal.

B. Input Variable Mapping Method

Here the proposed method for temporal variable mapping in to a SNN reservoir described above in relation to one embodiment of the invention is used.

C. NeuCube Initialization

We initialize the SNNr following the small world connection rule where: each neuron in the reservoir is connected to its nearby neurons which are within a distance d, where d is equal to the longest distance between any pair of neurons in the reservoir multiplied by a parameter r. The initial weights of the connections are set to the product of a random number within [−1, 1] and the inverse of the distance between them. We randomly select 80% of the connection weights to be positive and 20% to be negative.

The connection weights between the input neurons and other neurons are doubled in order to emphasize these neurons' significance in the reservoir.

D. Training Stage I: Unsupervised Reservoir Training

Figure 33:
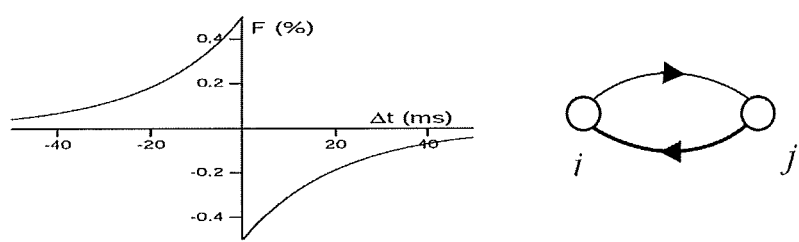
FIG. 33 is an illustration of an STDP learning rule according to an embodiment of the invention.
Figure 34:
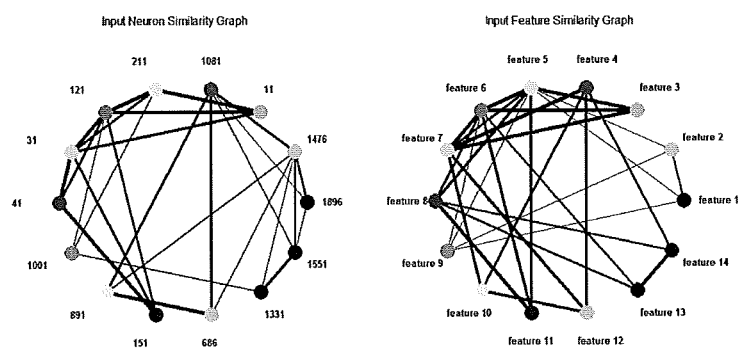
FIG. 34 is an illustration of an input mapping result according to an embodiment of the invention.

The unsupervised learning stage is intended to encode 'hidden' spatio-temporal relationships from the input data into neuronal connection weights. According to Hebbian learning rule, if the interaction between two neurons is persistent, then the connection between them will be strengthened. Specifically, we train the reservoir using spike-timing dependent synaptic plasticity (STDP) learning rule: if neuron j fires before neuron i, then the connection weight from neuron j to neuron i will increase and, on the other hand, the connection from neuron i to neuron j will decrease (FIG. 33). This ensures that the time difference in the input spiking trains, which encode the temporal patterns in the original input signals, will be captured by the neuron firing state and the unsymmetrical connection weights in the reservoir.

In the SNNr, when a neuron fires, it emits a spike and then its potential is reset to 0. Each neuron connecting to this firing neuron will receive a spike and its potential increases with respect to its connection weight to current firing neuron. The potential of each neuron has a small constant rate of leakage over the time unless it becomes 0. After learning, the connection weights in the reservoir encode temporal relationships from the input spatio-temporal data.

E. Training Stage II: Supervised Classifier Training

The second training stage is to train the output classifier using class label information associated with the training samples. The dynamic evolving Spike Neural Networks (deSNN) [7, 8] is used here as an output classifier, because deSNN is computationally efficient and emphasizes the importance of the first spike, which has been observed in biological systems. For each training sample, we create an output neuron and connect it with each neuron in the reservoir. The initial connection weights are all zero. The connection weights are then established by the Rank-Order (RO) learning rule as described above:

$$P(i,t) = \Sigma \bmod^{order(j)} w_{j,i} \quad (11)$$

where mod is a modulation factor; order(j) is the arriving order of the spikes to connection j, i, among all spikes from all connection to the neuron i. This learning rule endows a higher priority to the first spike coming to the output neuron. For the first spike in the reservoir excited by training sample k, the connection weights of corresponding output neuron are set by $$w_{j,i} = \bmod^{order(j)} \quad (12)$$

as described above. After the first spikes, the connection weight is modified according to firing state of the corresponding neuron in the reservoir: if a neuron fires, it emits a spike to all output neurons that have a connection with it and, as a result, the connection weight between this neuron and the corresponding output neurons strengthens and the potentials of these output neuron increase; otherwise the connection weight weakens and the potential of the output neuron leaks as time elapses. When the potential of an output neuron exceeds a firing threshold, a spike is emitted by it. After training, the connection weights between the output neurons and the reservoir neurons encode both the spike order and the support neurons of each training sample.

F. Testing with New Samples

Once the NeuCube$^{(ST)}$ is trained, all connection weights in the reservoir and in the output classification layer are established. These connections and weights can change based on further training (adaptation), because the evolvable characteristic of the architecture. For a given new sample without any class label information, the trained NeuCube$^{(ST)}$ can be used to predict its class label. For the deSNN classifier, there are two algorithms that can be used to determine the class label of the new sample [7, 8]:

a) deSNNs: it creates an output neuron for the new test sample and after the connection synaptic weights of this neuron are calculated, it compares these weights with the synaptic weights of those training neurons that were established during the supervised training process; the new testing sample is labeled with the label of the existing neuron whose weight vector is closest to that of the new neuron, created for the new sample.

b) deSNNm: it does not create any new output neuron. The new sample is fed to NeuCube$^{(ST)}$ and its class label is set to be same as the training sample whose corresponding output neuron fires first.

G. A Method for SNN Reservoir Structure Analysis Related to Data Interpretation of New Knowledge Discovery The proposed methods of mapping of data according to embodiments of the invention, either based on spatial allocation of the input variables as it is the case of brain data, or based on similarity of temporal patterns as it is the case in climate or other data, allows for a post-training analysis of the SNNr for a new knowledge discovery. Here a new method is proposed for the SNNr analysis in relation to data understanding, knowledge discovery and personalized profiling.

After it is trained, the SNNr has captured spatial and temporal relationships from the data. It is helpful to know how the neurons in reservoir are related with the input neurons and what the networks learnt from the input signals. This is important to understand the relationship between the learnt structure in the reservoir and the data set used for training. We propose the following algorithm to analyze the reservoir structure.

The neurons in the reservoir are indexed from 1 to N according to the ascending order of their x, y and z coordinates. We mark the input neurons as the information source in the reservoir and define an source matrix $F_{src} \in R^{N \times v}$ as follows: if neuron i is the input neuron of variable j, then the entry (i, j) of $F_{src}$ is 1, otherwise is 0. The affinity matrix $A \in R^{N \times N}$ of the reservoir is defined in this way: the entry (i, j) of A is the total spike amount transmitted between neuron i and neuron j. Note that more spike means more strong connections and more information shared between the neurons. Then the total amount of information for each neuron received from the input information sources is computed as follows:

1. Compute $S = D^{-1/2} A D^{-1/2}$, where D is a diagonal matrix with $D_{ii} = \Sigma_{j=1}^{N} A_{ij}$, i1, 2, . . . , N
2. Evaluate equation $\tilde{F} = I_{rate} S \tilde{F} + (I - I_{rate}) F_{src}$ repeatedly until convergence.
3. Normalize $F = G^{-1} \tilde{F}$, where G is a diagonal matrix with $G_{ii} = \Sigma_{j=1}^{C} \tilde{F}_{ij}$.

where I is the identity matrix and $I_{rate}$ is a diagonal matrix defining the propagation rates on different directions. In the first iteration $\tilde{F} = F_{src}$. The main principle behind the algorithm is that information (or activation) can propagate on a network and the propagation process is dominated by the network structure [12]. During iterations, the information is propagated from the source neurons to other neurons in the reservoir, with respect to the connection strength between neurons and the propagation factor matrix defined by $I_{rate}$.

The propagation factor matrix $I_{rate}$ controls the convergence of the propagation algorithm and the speed of the information being propagated from sources to other neurons in the reservoir. Here $I_{rate}$ is computed by $(I_{rate})_{ii} = \exp(-\bar{d}_i^2 / 2\sigma^2)$, where $\bar{d}_i$ is the mean affinity value between a neuron and its 8 neighboring neurons, so that the propagation speed between strongly connected neurons is large while the speed between weakly connected neurons is small.

We now show the propagation algorithm converges. After the $i^{th}$ iteration, we have $$\tilde{F} = A_{sc} F_{src} + (I - I_{rate}) A_{nb} F_{src} \qquad (13)$$

where $A_{sc} = (I_{rate} S)^{i-1}$ and $A_{nb} = \Sigma_{k=0}^{i} (I_{rate} S)^k$, representing the information amount acquired from sources and neighborhood, respectively. Since the spectral radius $\rho(I_{rate}) < 1$, $\rho(S) = \rho(D^{-1} A) \leq \|D^{-1} A\|_\infty = 1$ (the first equation is based on property of similarity: $S = D^{-1/2} A D^{-1/2} = D^{1/2} (D^{-1} A) D^{-1/2}$, so S is similar to $D^{-1} A$) and $\rho(AB) \leq \rho(A) \rho(B)$, so $\rho(I_{rate} S) < 1$, $$\lim_{i \to \infty} A_{sc} = 0, \lim_{i \to \infty} A_{nb} = (I - I_{rate} S)^{-1}$$

and $$\lim_{i \to \infty} \tilde{F}^{(i)} = (I - I_{rate})(I - I_{rate} S)^{-1} F_{src} \qquad (14)$$

After the algorithm converges, the entry (i, j) of F represents the information amount of neuron i acquired from input variable j. According to F, we can uncover the neural clustering structure in the reservoir and the interaction between different input variables. This will be demonstrated in the experimental result section.

H. NeuCube Visualization

Figure 35:
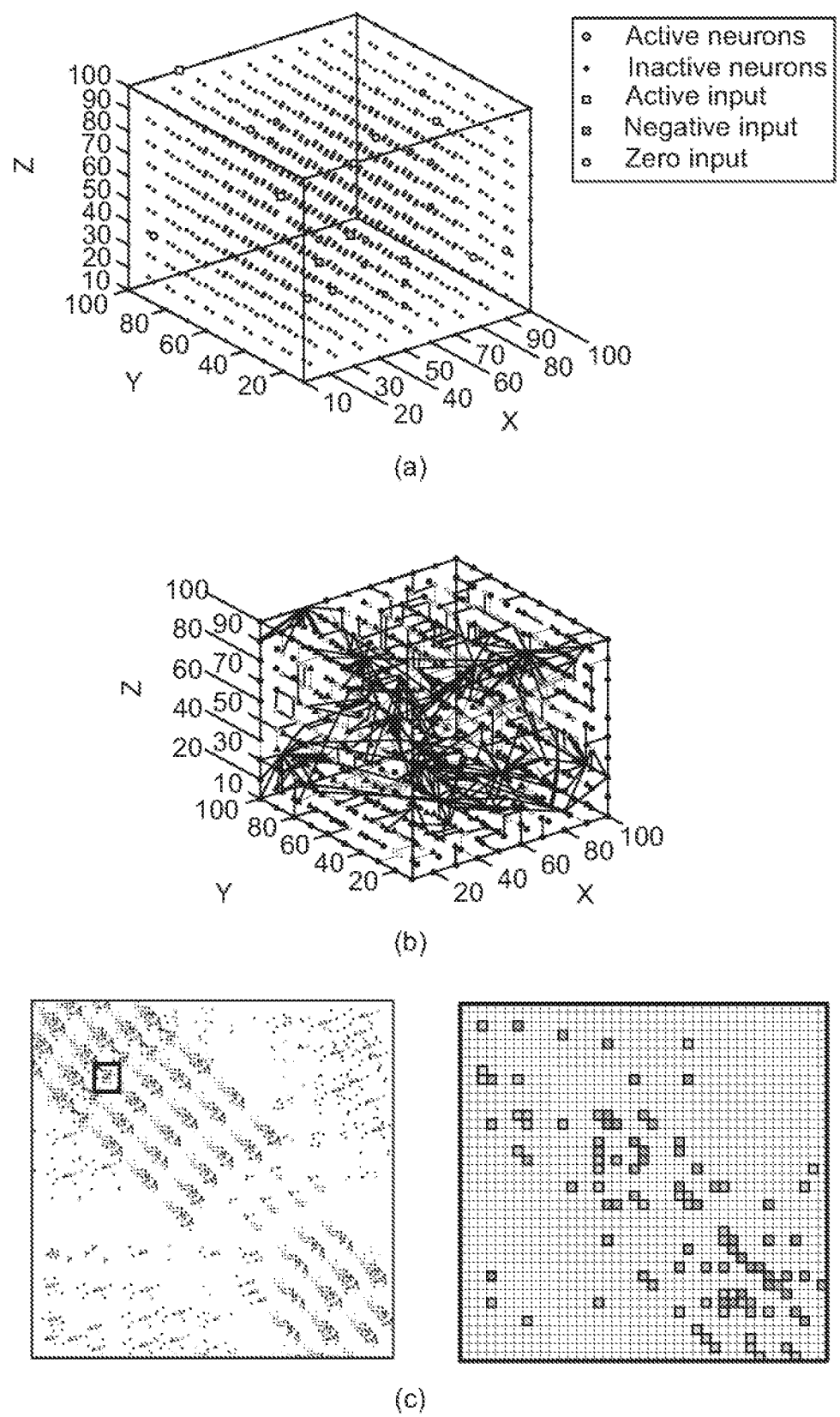
FIG. 35(a)-(c) are illustrations of dynamic visualisation of a SNNr according to an embodiment of the invention.

Visualization of the neuron activities, the connection weight changes and the structure of the SNNr are important for understanding the data and processes that generated it. In NeuCube we can visualise at each moment the spiking state of the neurons in the SNNr and their connection adjustment. FIG. 35 shows snapshots of the instantaneous neuron spiking state, the connections between neurons and the weight adjustment during a SNNr training. This is very different from traditional methods such SVM which have been used for same tasks but without offering facilities to trace the learning processes for the sake of data understanding.

Case Study of Aphids Population Early Prediction

Figure 17:
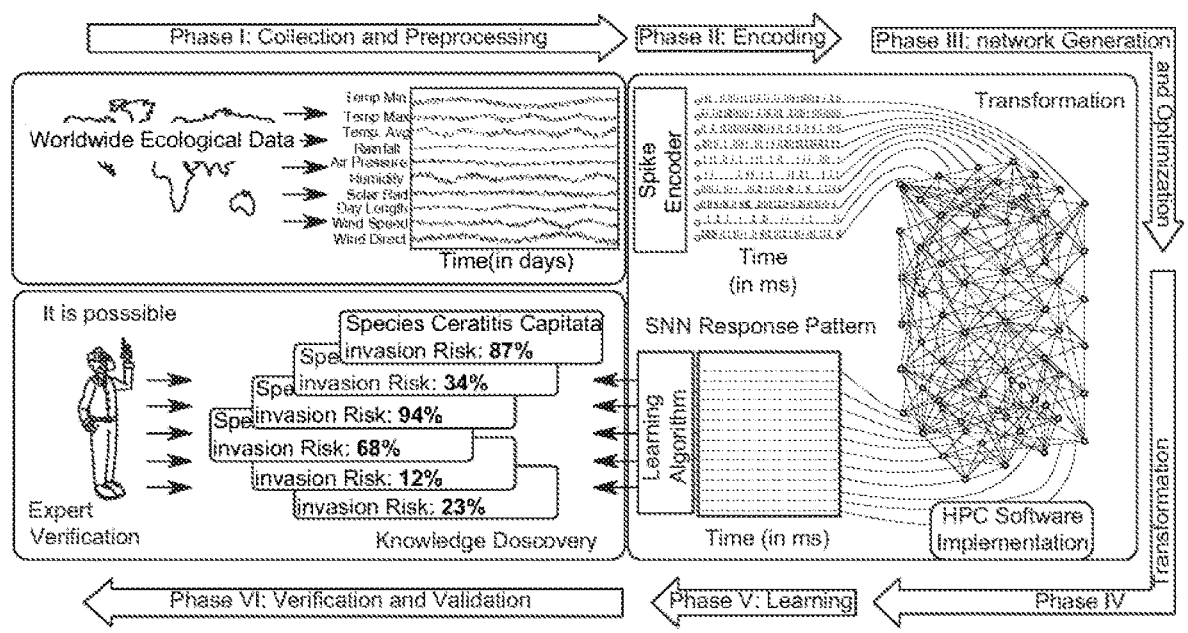
FIG. 17 is a block diagram of an exemplary system for personalised ecological event prediction according to an embodiment of the invention.

Ecological event prediction based on spatio-temporal data is a difficult problem [33]. FIG. 17 shows an exemplary implementation diagram of a PMeSNNr according to an embodiment of the invention for ecological data modelling of the risk of establishment of harmful species based on geographical (spatial) locations and temporal environmental variables along with the class labels 'not established' and 'established'. The system can be used to predict earlier if particular species will establish in an individual geographical region and how many days ahead it is likely to happen based on temporal environmental daily variable values (e.g. temperature, wind, soil, vegetation).

The NeuCube method and system described above is illustrated here on a case study involving predictive modelling in ecology. Specifically, a model is created to predict aphid abundances in autumn in a geographical location over 11 years.

As major pests, some species of aphids can pose significant damage to autumn agricultural produce particularly wheat crops. Thus, the prediction of a possible abundance of aphids in the autumn seasons becomes important for growers to manage these pests. The numbers of a particular species of aphids (in this study *Rophalosiphum padi*) in autumn are considered to be correlated with environmental conditions and the numbers of aphids in previous spring]. The raw data which will be used in the prediction study includes two sets of temporal data. One set is weekly aphid trap catches recorded by Crop & Food Research, Lincoln, Canterbury, New Zealand. The other is made of weekly records for weather variables at the Canterbury Agricultural research centre, Lincoln, New Zealand.

The weather variables include: 1) average rain fall (mm); 2) cumulative weekly rainfall (mm); 3) maximum air temperature (° C.); 4) minimum air temperature (° C.); 5) mean air temperature (° C.); 6) cumulative degree days for the week (° C.); 7) grass temperature (° C.); 8) soil temperature at 100 cm below ground (° C.); 9) Penman potential evaporation (mm); 10) vapour pressure (hPa); 11) potential deficit of rainfall (i.e. accumulated excess of Penman over rainfall); 12), solar radiation (MJ/m2); and 13) wind run (km/day).

Some pre-processing was applied to the raw dataset used in this experiment. Specifically, for each of the 13 environmental variables, six derived variables were calculated. In this study, for each environmental variable, four variables were generated for the averages of previous 1, 2, 3, and 4 weeks. Among these variables, 14 of them are selected for the current study, based on two rules. Rule 1, for each original weather variable, either the original variable itself, or one of the six generated variables should be selected. Thus, the attribute dimension which is represented by them can be kept in the following study. Rule 2, to select a variable from either the original variable or its six derived variables, the one with the maximum correlation co-efficient with aphid counts will be chosen. Thus, for the following analysis, there are total of fourteen variables: 1) average rainfall (AR, mm); 2) cumulative rainfall, the average of 4 weeks (CR, mm); 3) cumulative degree days (DCT, ° C.); 4) grass temperature, average of four weeks (GT, ° C.); 5) maximum air temperature (MaxT, ° C.); 6) mean air temperature (MeanT, ° C.); 7) minimum air temperature, average of two weeks (MinT, ° C.); 8) Penman potential evaporation (PPE, mm); 9) potential deficit of rainfall (PDR), first order derivative; 10) soil temperature (ST, ° C.); 11) solar radiation (SR, MG/m2); 12) vapour pressure, average of five weeks (VP, hPa); 13) wind run (WR4), average of four weeks (km/day); 14) wind run (WR5), average of five weeks (km/day).

While the time period covered by the original data is from week 27 of 1981 to week 50 of 2000, the whole time series will be parsed into yearly based periods. Each of the time periods will start from week 31 to week 30 the following year. Each of the time segments will be treated as an individual case. For such cases, the associations of spring aphid patterns, the following autumn patterns, and the weather variables for the corresponding periods were the focus.

Based on the examination of the aphid patterns for these time segments, data from 11 years were selected. These 11 years have their spring aphid spikes happening around week 46 of the Julian year. The autumn aphid patterns of these 11 years can be classified into two categories based on the original raw data—the high aphid pattern (class 1) or low aphid pattern (class 2) in autumn. The autumn patterns of aphids of these 11 years will be learnt by the NeuCube. For any future year, when the spring aphid population peaks at about week 46, the potential autumn aphid pattern in the following year can be predicted.

We conduct three experiments on this real world aphid data set to show the validity of the NeuCube architecture and how soon before the event our model can achieve a good prediction.

Figure 36:
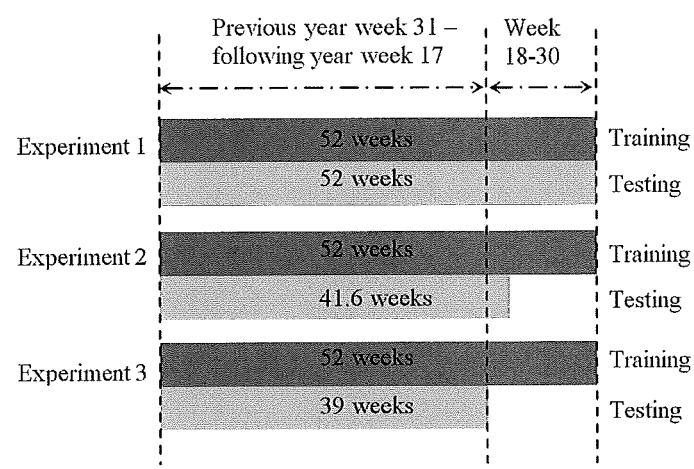
FIG. 36 is an illustration of an experimental design according to an embodiment of the invention.

In the first experiment, we aimed to show the predictive ability of NeuCube for full time length variables. We use the whole time available, i.e. 52 weeks, for both training and testing under the assumption that a perfect weather forecast for the autumn season can be obtained which is an ideal case, but not a realistic one. In the following experiments two and three, we aimed to show the predictive ability of NeuCube and how early the model can predict the autumn pattern. In these two experiments, we trained NeuCube using 100% of the time length samples, but only 80% and 75% of the time length to predict the aphid population pattern in the last 25% time period, as illustrated in FIG. 36. The blue bars represent training data length and the yellow bars validation data length.

In all these experiments, the size of the SNNr is 2000 neurons (5×20×20). It is trained and tested in a leave-one-out cross validation mode. This is based on the assumption that the climate change trend during these 11 years can be ignored and the weather variables are independent between different years.

FIG. 37 shows the input variable mapping result on the minimal x coordinate face of the cubic reservoir. Note the two main groups of weather variables, in other words, temperature (MaxT, minT, MeanT, DCT, GT, ST) and rainfall (AR, CR, PDR), are mapped to nearby neurons. The solar radiation (SR) is mapped in the middle of temperature variables because temperature is greatly determined by solar radiation.

Figure 38:
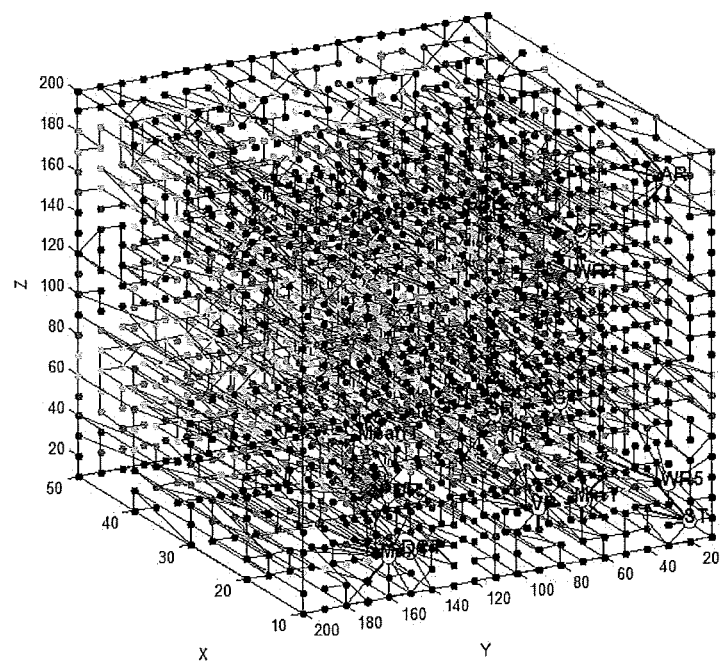
FIG. 38a is an illustration of neuron connections according to an embodiment of the invention.
FIG. 38b is an illustration of neuron activity according to an embodiment of the invention.
Figure 38:
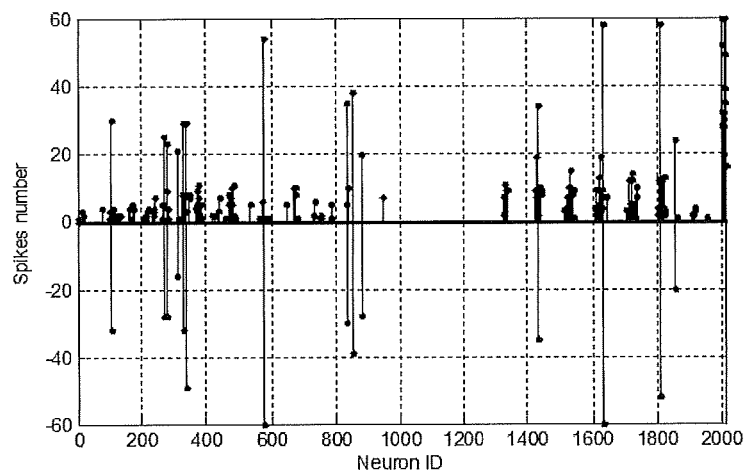

FIG. 38 (a) shows the neuron connections with absolute weights larger than 0.07 after the reservoir is trained in one run. FIG. 38 (b) plots the total number of spikes each neuron emitted during the training process.

In FIG. 38 (a) blue lines represent connections with positive weight and red lines represent connections with negative weights. The line thickness indicates the strength of the connection. The neurons are coloured to indicate their connection strength with other neurons in the reservoir. Brighter neurons have stronger connections with other neurons while darker neurons have weaker connection with others.

From the visualization, we can derive some conclusions and achieve a better understanding of the data and the problem:

a) Connections between nearby input neurons are denser than the connections between far away input neurons. This indicates that there are more interactions between input variables mapped to closer neurons.

b). Neurons in the middle of the reservoir are generally more active than those on the edges. This indicates that the neurons in the reservoir are not uniformly activated that reflects on the input data.

Figure 39:
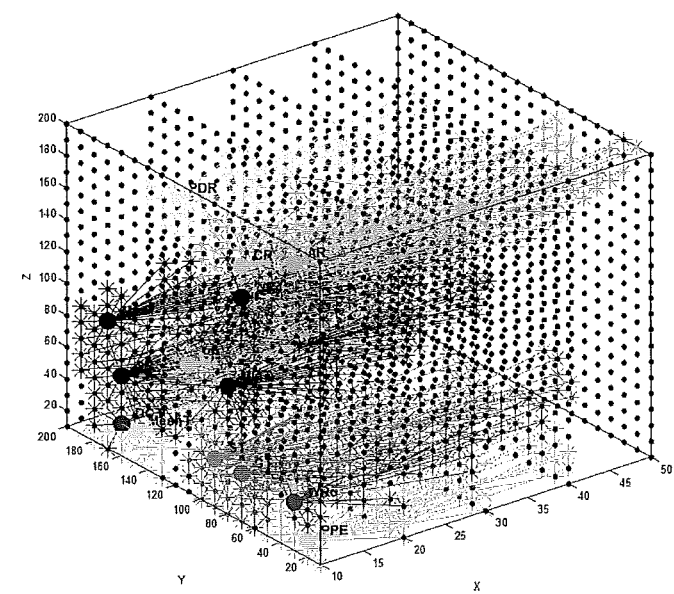
FIG. 39a is an illustration of an SNNr structure according to an embodiment of the invention.
FIG. 39b provides a graph of input spike numbers and a graph of neuronal connections according to an embodiment of the invention.
Figure 39:
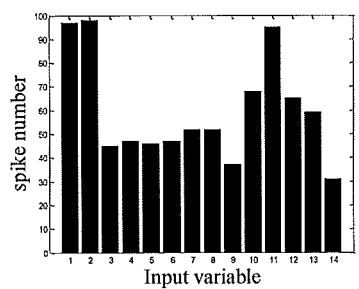
Figure 39:
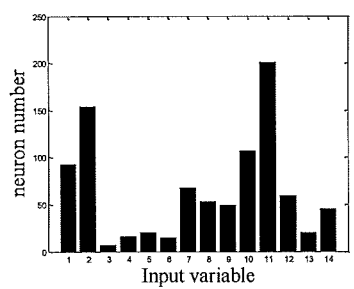

We can also analyze the SNNr structure in terms of information distribution and spread]. We first treat the input neurons as the information sources in the network and then use a spreading algorithm to determine neuron clusters belonging to each information source based on the spike transmission in the network. So the more spikes that are transmitted between two neurons, the tighter they will be connected with each other. After this we link a neuron to the one from which it receives most spikes. FIG. 39 (a) shows the network structure after unsupervised training. The big solid dots represent input neurons and other neurons are labeled in the same intensity as the input neuron from which it receives most spikes. The unconnected dots mean no spike arrived at that neuron. In FIG. 39 (b), the left pane is spike number for each variable after encoding and the right pane is the neuron number belonging to each input variable cluster. From this figure we can see the consistency between the input signal spike train and the reservoir structure. It is worth noting that variable 11 (solar radiation) is emphasized in the reservoir that suggests a greater impact of the solar radiation on the aphid number.

Figure 40:
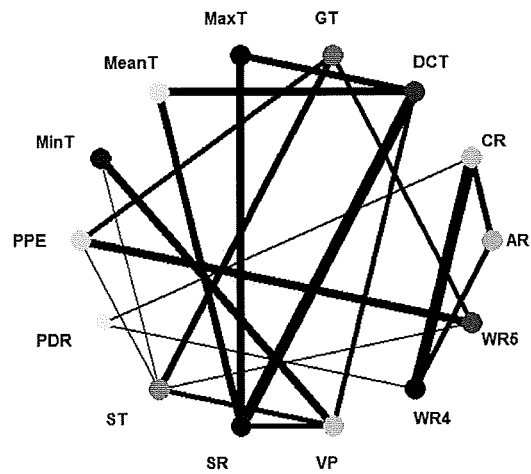
FIGS. 40(a) and (b) are illustrations of variable clusters according to an embodiment of the invention.
Figure 40:
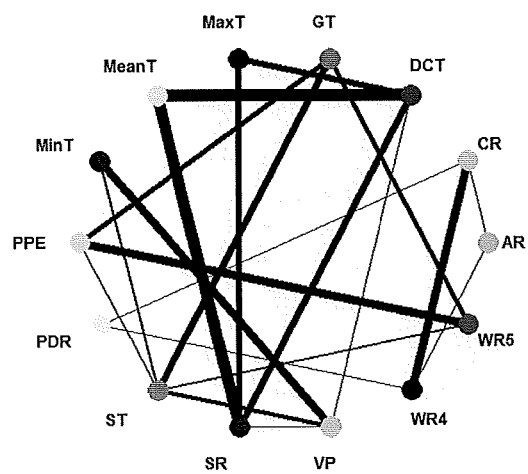

FIG. 40 shows the total cut value and the averaged cut value between the input variable clusters. The cut value reflects the tightness between clusters and here it can be interpreted as the information amount transmitted between neurons belong to different clusters. Greater cut value means more spikes are transmitted between the clusters and thus higher interaction between them in the reservoir. The thickness of the lines proportions the amount of the cut value.

The early event prediction accuracy on the aphid data set is shown in table I, where the middle row is the time length of test data used for the prediction.

TABLE I

AUTUMN APHID PREDICTION ACCURACY (%)

| | Accuracy of each testing time length (weeks) | | |
|---|---|---|---|
| | 52 (full) | 41.6 (early) | 39 |
| Accuracy | 100% | 90.91% | 81.82% |

In the third experiment, 75% of the temporal input data (39 weeks, out of total 52 weeks per year) is used comprising data from week 31 in the previous year to week 18 in following year, where week 18 is at the beginning of the autumn period. At this time of the year an accurate prediction of whether there will be a high aphid amount peaks in later weeks is very important for both ecology and agriculture, because early actions can be taken to prevent the spread of aphid population. For this time length, with 75% of time observed, our model can give 81.82% prediction accuracy. In the second experiment, 80% of time length (41.6 weeks of total 52 weeks per year) is from week 31 in previous year to week 20.6 in next year, where week 20.6 is at the head of the aphid flight period. At this time of the year, some first small aphid peaks have arrived. From this we can see that our model can make early decision before the peak appears. With 80% of data observed (early in the aphid flight period), we can have more than 90% confidence to make an early decision. Furthermore, as the time passes, if new data are collected, it can be added directly to the testing sample to give a better prediction, without re-training the model using both old and new data as it would be the case with SVM or MLP methods. This is the essential difference between the new method and traditional methods such as SVM and MLP.

Figure 41:
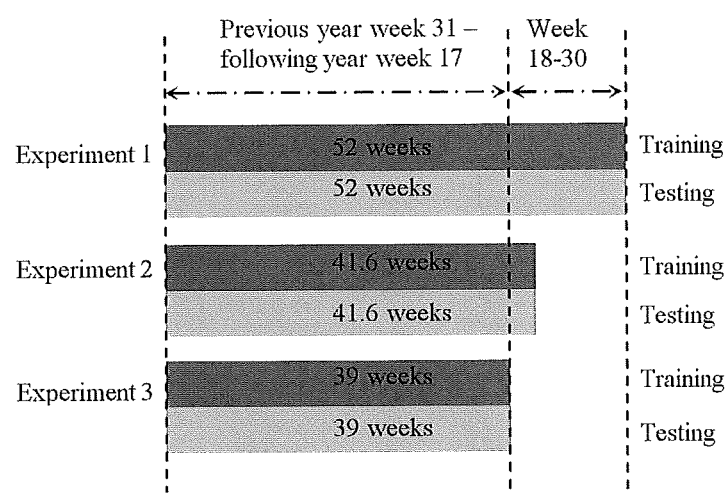
FIG. 41 is an illustration of experimental design according to an embodiment of the invention.

We conducted experiments to compare between traditional modeling methods and our new modeling method for early event prediction. We used multiple-linear regression (MLR), support vector machine (SVM), multilayer perceptron (MLP), k nearest neighbors (kNN) and weighted k nearest neighbors (wkNN) as the baseline algorithms. We designed three experiments for these baseline algorithms, as illustrated in FIG. 41. Note that for these baseline algorithms, the time length of training samples and testing samples have to be the same as these methods cannot tolerate different lengths of feature vectors for training and recall.

Figure 42:
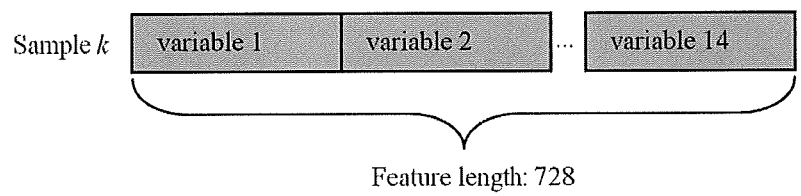
FIG. 42 is an illustration of a data set according to an embodiment of the invention.

We prepared the data set in this way: for experiment 1, we concatenated the weather variables one after another to form a long feature vector for each sample, as shown in FIG. 42. For each weather variable, there are 52 data points in one year (one data point per week), so the length of final feature, counting 14 variables data, will be 578. For experiments 2 and 3, we removed the corresponding percentage of data points from each year's data and then perform the same procedure as in experiment 1.

We tune the parameters of the baseline algorithms in a grid search way and the final parameters are: a degree 2 polynomial kernel for SVM; 30 hidden neurons and 500 training cycles for MLP; k=5 for both kNN and wkNN. Experimental results are shown in Table II.

TABLE II

PREDICTION ACCURACY OF APHID DATA SET (%)

| | Accuracy of each training and testing time length (weeks) | | |
|---|---|---|---|
| | 52 | 41.6 | 39 |
| MLR | 36.36 | 64.63 | 72.73 |
| SVM | 72.73 | 72.73 | 63.64 |
| MLP | 81.82 | 81.82 | 81.82 |
| kNN | 72.73 | 63.64 | 63.64 |
| wkNN | 72.73 | 63.64 | 63.64 |
| Max | 81.82 | 81.82 | 81.82 |

Comparing table I and table II, we can see that NeuCube can perform better for early event prediction. A realistic early event prediction should be that as the time length of observed data increases, the prediction accuracy will also increase. But from table II we can see that as the time length of training data increase, traditional modeling methods do not necessarily produce better results (some even worsen), because they cannot model the whole spatio-temporal relationship in the prediction task. They can only model a certain time segment. Because NeuCube) models the whole spatio-temporal relationship in the data, even a small amount of input data can trigger spiking activities in the SNNr that will correspond to the learned full temporal patterns resulting in a better prediction when more temporal data entered.

Other Case Studies

Other possible applications of the invention include:
Integrated fMRI-, EEG- and gene brain data modelling—FIG. 43;
Other ecological data modelling and event prediction;
Cardio-vascular risk of occurrence prediction;
Earthquake and other environmental events prediction;
Financial market crash prediction;
Machine failure prediction; and
Personal gambling addiction prediction.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

REFERENCES

[1] Kasabov, N. (2008) Data Analysis and Predictive Systems and Related Methodologies—Personalised Trait Modelling System, New Zealand Patent No. 572036, PCT/NZ2009/000222, NZ2009/000222-W16-79.

[2] Kasabov, N., & Hu, Y. J. (2010). Integrated optimisation method for personalised modelling and case studies for medical decision support. International Journal of Functional Informatics and Personalised Medicine, 3(3), 236-256.

[3] Hodgkin, A. L. and A. F. Huxley (1952) A quantitative description of membrane current and its application to conduction and excitation in nerve. Journal of Physiology, 117: 500-544.

[4] Gerstner, W. (1995) Time structure of the activity of neural network models, Phys. Rev 51: 738-758.

[5] Maass, W. and A. M. Zador. Computing and learning with dynamic synapses. In Pulsed neural networks, pages 321-336. MIT Press, 1999.

[6] Kistler, G., and W. Gerstner, Spiking Neuron Models—Single Neurons, Populations, Plasticity, Cambridge Univ. Press, 2002.

[7] Izhikevich, E. M. (2004). Which model to use for cortical spiking neurons? IEEE TNN, 15(5)1063-70.

[8] Izhikevich, E. M.: Polychronization: Computation with Spikes. Neural Computation 18, 245-282 (2006)

[9] Belatreche, A., Maguire, L. P., and McGinnity, M. Advances in Design and Application of Spiking Neural Networks. Soft Comput. 11, 3, 239-248, 2006

[10] Brette R., et al, (2007). Simulation of networks of spiking neurons: a review of tools and strategies. J. Comput. Neurosci. 23, 349-398.

[11] Thorpe, S. and J. Gautrais, "Rank order coding," Computational Neuroscience: Trends in research, vol. 13, pp. 113-119, 1998.

[12] Masquelier, T., R. Guyonneau and S. J. Thorpe (2008) Spike timing dependent plasticity finds the start of repeating patterns in continuous spike trains. PLoS ONE 3 (1) e1377.

[13] Kasabov, N., (2007) Evolving connectionist systems, Springer, London (first edition 2002).

[14] Wysoski, S., L. Benuskova, N. Kasabov, Evolving spiking neural networks for audiovisual information processing, Neural Networks, vol. 23, 7, pp 819-835, 2010.

[15] Kasabov, N., Dhoble, K., Nuntalid, N. and Indiveri, G. Dynamic Evolving Spiking Neural Networks for On-line Spatio- and Spectro-Temporal Pattern Recognition, Neural Networks, Volume 41, May 2013, Pages 188-201

[16] Schliebs, S. and N. Kasabov, Evolving spiking neural networks: A Survey, Evolving Systems, Springer, vol. 4, 2, 87-98, 2013.

[17] Mohemmed, A. and S. Schliebs and S. Matsuda and N. Kasabov, SPAN: Spike Pattern Association Neuron for Learning Spatio-Temporal Sequences, International Journal of Neural Systems, Vol. 22, No. 4 (2012) 1-16, 2012.

[18] Mohemmed, A., S. Schliebs, S. Matsuda and N. Kasabov, Training Spiking Neural Networks to Associate Spatio-temporal Input-Output Spike Patterns, Neurocomputing, Volume 107, 1 May 2013, Pages 3-10.

[19] Kasabov, N. To spike or not to spike: A probabilistic spiking neuron model, Neural Networks, 23(1), 16-19, 2010.

[20] Watts, M. (2009) A Decade of Kasabov's Evolving Connectionist Systems: A Review, IEEE Trans. SMC—Part C: Applications and Reviews, vol. 39, no. 3, 253-269.

[21] Soltic and S. Kasabov, N. (2010), "Knowledge extraction from evolving spiking neural networks with rank order population coding," Int. J. Neural Systems, 20:6, pp. 437-445.

[22] Feigin, V. L., Barker-Collo, S., Parag, V., Lawes, C. M. M., Ratnasabapathy, Y. & Glen, E. (2010). Auckland stroke outcomes study. Part 1: Gender, stroke types, ethnicity, and functional outcomes 5 years poststroke. Neurology, 75 (18), 1597-1607.

[23] Feigin, V. L., Carter, K., Hackett, M., Barber, P., McNaughton, H. & Dyall, L. (2006). Ethnic disparities in incidence of stroke subtypes: Auckland regional community stroke study, 2002-2003. The Lancet Neurology, 5 (2), 130-139.

[24] Feigin, V. L., Lawes, C., Bennett, D. & Anderson, C. (2003). Stroke epidemiology: A review of population based studies of incidence, prevalence, and case fatality in the late 20th century. The Lancet Neurology, 2 (1), 43-53.

[25] Feigin, V. L., Lawes, C., Bennett, D., Barker, S. & Varsha, P. (2009). Worldwide stroke incidence and early case fatality reported in 56 population based studies: A systematic review. The Lancet Neurology, 8 (4), 355-369.

[26] Barker-Collo, S., Feigin, V. L., Parag, V., Lawes, C. M. M., & Senior, H. (2010). Auckland Stroke Outcomes Study. Neurology, 75(18), 1608-1616.

[27] Mukamal, K. J., Wellenius, G. A., Suh, H. H. & Mittleman, M. A. (2009). Weather and air pollution as triggers of severe headaches. Neurology, 72, 922-927.

[28] Vlak, M., Rinkel, G., Greebe, P., van der Born, J. & Algra, A. (2011). Trigger factors and their attributable risk for rupture of intracranial aneurysms: A case-crossover study. Stroke, 42, 1878-1882.

[29] Liang, Wen, Yingjie Hu, Nikola Kasabov (2013) Evolving Personalized Modeling System for Integrated Feature, Neighborhood and Parameter Optimization utilizing Gravitational Search Algorithm. Evolving System. Springer, Accepted, 2013.

[30] Rashedi, E., Nezamabadi-pour, H., & Saryazdi, S. (2009). GSA: A gravitational search algorithm. Information Sciences, 179, 2232-2248.

[31] Defoin-Platel, M., S. Schliebs, N. Kasabov, Quantum-inspired Evolutionary Algorithm: A multi-model EDA, IEEE Trans. Evol. Computation, vol. 13, No. 6, December 2009, 1218-1232.

[32] Feigin, V. L., Nikitin, Y. & Vinogradova, T. (1997). Solar and geomagnetic activities: Are there associations with stroke occurrence? Cerebrovascular Diseases, 7 (6), 345-348.

[33] Schliebs, Michael Defoin Platel, Susan Worner and Nikola Kasabov, Integrated Feature and Parameter Optimization for Evolving Spiking Neural Networks: Exploring Heterogeneous Probabilistic Models, Neural Networks, 22, 623-632, 2009.

[34] Koessler, L., L. Maillard, A. Benhadid et al. Automated cortical projection of EEG sensors: Anatomical correlation via the international 10-10 system, NeuroImage, 2006; 46:64-72.

[35] Talairach, J., P. Tournoux, Co-planar Stereotaxic Atlas of the Human Brain: 3-Dimensional Proportional System—an Approach to Cerebral Imaging, Thieme Medical Publishers, NY (1988).
[36] Emotiv: www.emotiv.com, last visited 22 Jun. 2013.
[37] Delbruck, T., jAER open source project, 2007, http://jaer.wiki.sourceforge.net.
[38] Hawrylycz, M., et al, An anatomically comprehensive atlas of the adult human brain transcriptome, Nature, vol. 489, 391-399, 2012.
[39] Indiveri, G., B. Linares-Barranco, T. Hamilton, A. Van Schaik, R. Etienne-Cummings, T. Delbruck, S. Liu, P. Dudek, P. Wagger, S. Renaud et al., "Neuromorphic silicon neuron circuits," Frontiers in Neuroscience, 5, 2011.
[40] Wang, X., Hou, Z. G., Zou, A., Tan, M., and Cheng, L., A behavior controller for mobile robot based on spiking neural networks, Neurocomputing (Elsevier), 2008, vol. 71, nos. 4-6, pp. 655-666.

APPENDIX 1

Exemplar mapping of EEG data channels as input variables of EEG spatio-temporal brain data into input neurons of a SNNr. The input neurons have the same coordinates in the SNNr as the Talairach coordinates of the brain locations (1-20 EEG channel allocation systems, 64 channels)

| EEG Chanel (input data variable) | Talairach coordinates [x avg (mm) y avg (mm) z avg (mm)] (also 3D coordinates of input neurons in the SNNr) | Gyri | Brodmann Area |
|---|---|---|---|
| FP1 | −21.2 ± 4.7 66.9 ± 3.8 12.1 ± 6.6 | L FL | Superior frontal G 10 |
| FPz | 1.4 ± 2.9 65.1 ± 5.6 11.3 ± 6.8 | M FL | Bilat. medial 10 |
| FP2 | 24.3 ± 3.2 66.3 ± 3.5 12.5 ± 6.1 | R FL | Superior frontal G 10 |
| AF7 | −41.7 ± 4.5 52.8 ± 5.4 11.3 ± 6.8 | L FL | Middle frontal G 10 |
| AF3 | −32.7 ± 4.9 48.4 ± 6.7 32.8 ± 6.4 | L FL | Superior frontal G 9 |
| AFz | 1.8 ± 3.8 54.8 ± 7.3 37.9 ± 8.6 | M FL | Bilat. medial 9 |
| AF4 | 35.1 ± 3.9 50.1 ± 5.3 31.1 ± 7.5 | L FL | Superior frontal G 9 |
| AF8 | 43.9 ± 3.3 52.7 ± 5.0 9.3 ± 6.5 | R FL | Middle frontal G 10 |
| F7 | −52.1 ± 3.0 28.6 ± 6.4 3.8 ± 5.6 | L FL | Inferior frontal G 45 |
| F5 | −51.4 ± 3.8 26.7 ± 7.2 24.7 ± 9.4 | L FL | Middle frontal G 46 |
| F3 | −39.7 ± 5.0 25.3 ± 7.5 44.7 ± 7.9 | L FL | Middle frontal G 8 |
| F1 | −22.1 ± 6.1 26.8 ± 7.2 54.9 ± 6.7 | L FL | Superior frontal G 6 |
| Fz | 0.0 ± 6.4 26.8 ± 7.9 60.6 ± 6.5 | M FL | Bilat. medial 6 |
| F2 | 23.6 ± 5.0 28.2 ± 7.4 55.6 ± 6.2 | R FL | Superior frontal G 6 |
| F4 | 41.9 ± 4.8 27.5 ± 7.3 43.9 ± 7.6 | R FL | Middle frontal G 8 |
| F6 | 52.9 ± 3.6 28.7 ± 7.2 25.2 ± 7.4 | R FL | Middle frontal G 46 |
| F8 | 53.2 ± 2.8 28.4 ± 6.3 3.1 ± 6.9 | R FL | Inferior frontal G 45 |
| FT9 | −53.8 ± 3.3 −2.1 ± 6.0 −29.1 ± 6.3 | L TL | Inferior temporal G 20 |
| FT7 | −59.2 ± 3.1 3.4 ± 5.6 −2.1 ± 7.5 | L TL | Superior temporal G 22 |
| FC5 | −59.1 ± 3.7 3.0 ± 6.1 26.1 ± 5.8 | L FL | Precentral G 6 |
| FC3 | −45.5 ± 5.5 2.4 ± 8.3 51.3 ± 6.2 | L FL | Middle frontal G 6 |
| FC1 | −24.7 ± 5.7 0.3 ± 8.5 66.4 ± 4.6 | L FL | Superior frontal G 6 |
| FCz | 1.0 ± 5.1 1.0 ± 8.4 72.8 ± 6.6 | M FL | Superior frontal G 6 |
| FC2 | 26.1 ± 4.9 3.2 ± 9.0 66.0 ± 5.6 | R FL | Superior frontal G 6 |
| FC4 | 47.5 ± 4.4 4.6 ± 7.6 49.7 ± 6.7 | R FL | Middle frontal G 6 |
| FC6 | 60.5 ± 2.8 4.9 ± 7.3 25.5 ± 7.8 | R FL | Precentral G 6 |
| FT8 | 60.2 ± 2.5 4.7 ± 5.1 −2.8 ± 6.3 | L TL | Superior temporal G 22 |
| FT10 | 55.0 ± 3.2 −3.6 ± 5.6 −31.0 ± 7.9 | R TL | Inferior temporal G 20 |
| T7 | −65.8 ± 3.3 −17.8 ± 6.8 −2.9 ± 6.1 | L TL | Middle temporal G 21 |
| C5 | −63.6 ± 3.3 −18.9 ± 7.8 25.8 ± 5.8 | L PL | Postcentral G 123 |
| C3 | −49.1 ± 5.5 −20.7 ± 9.1 53.2 ± 6.1 | L PL | Postcentral G 123 |
| C1 | −25.1 ± 5.6 −22.5 ± 9.2 70.1 ± 5.3 | L FL | Precentral G 4 |
| Cz | 0.8 ± 4.9 −21.9 ± 9.4 77.4 ± 6.7 | M FL | Precentral G 4 |
| C2 | 26.7 ± 5.3 −20.9 ± 9.1 69.5 ± 5.2 | R FL | Precentral G 4 |
| C4 | 50.3 ± 4.6 −18.8 ± 8.3 53.0 ± 6.4 | R PL | Postcentral G 123 |
| C6 | 65.2 ± 2.6 −18.0 ± 7.1 26.4 ± 6.4 | R PL | Postcentral G 123 |
| T8 | 67.4 ± 2.3 −18.5 ± 6.9 −3.4 ± 7.0 | R TL | Middle temporal G 21 |
| TP7 | −63.6 ± 4.5 −44.7 ± 7.2 −4.0 ± 6.6 | L TL | Middle temporal G 21 |
| CP5 | −61.8 ± 4.7 −46.2 ± 8.0 22.5 ± 7.6 | L PL | Supramarginal G 40 |
| CP3 | −46.9 ± 5.8 −47.7 ± 9.3 49.7 ± 7.7 | L PL | Inferior parietal G 40 |
| CP1 | −24.0 ± 6.4 −49.1 ± 9.9 66.1 ± 8.0 | L PL | Postcentral G 7 |
| CPz | 0.7 ± 4.9 −47.9 ± 9.3 72.6 ± 7.7 | M PL | Postcentral G 7 |
| CP2 | 25.8 ± 6.2 −47.1 ± 9.2 66.0 ± 7.5 | R PL | Postcentral G 7 |
| CP4 | 49.5 ± 5.9 −45.5 ± 7.9 50.7 ± 7.1 | R PL | Inferior parietal G 40 |
| CP6 | 62.9 ± 3.7 −44.6 ± 6.8 24.4 ± 8.4 | R PL | Supramarginal G 40 |
| TP8 | 64.6 ± 3.3 −45.4 ± 6.6 −3.7 ± 7.3 | R TL | Middle temporal G 21 |
| P9 | −50.8 ± 4.7 −51.3 ± 8.6 −37.7 ± 8.3 | L TL | Tonsile NP |
| P7 | −55.9 ± 4.5 −64.8 ± 5.3 0.0 ± 9.3 | L TL | Inferior temporal G 37 |
| P5 | −52.7 ± 5.0 −67.1 ± 6.8 19.9 ± 10.4 | L TL | Middle temporal G 39 |
| P3 | −41.4 ± 5.7 −67.8 ± 8.4 42.4 ± 9.5 | L PL | Precuneus 19 |
| P1 | −21.6 ± 5.8 −71.3 ± 9.3 52.6 ± 10.1 | L PL | Precuneus 7 |
| Pz | 0.7 ± 6.3 −69.3 ± 8.4 56.9 ± 9.9 | M PL | Superior parietal L 7 |
| P2 | 24.4 ± 6.3 −69.9 ± 8.5 53.5 ± 9.4 | R PL | Precuneus 7 |
| P4 | 44.2 ± 6.5 −65.8 ± 8.1 42.7 ± 8.5 | R PL | Inferior parietal L 7 |
| P6 | 54.4 ± 4.3 −65.3 ± 6.0 20.2 ± 9.4 | R TL | Middle temporal G 39 |
| P8 | 56.4 ± 3.7 −64.4 ± 5.6 0.1 ± 8.5 | R TL | Inferior temporal G 19 |
| P10 | 51.0 ± 3.5 −53.9 ± 8.7 −36.5 ± 10.0 | L OL | Tonsile NP |

APPENDIX 1-continued

Exemplar mapping of EEG data channels as input variables of
EEG spatio-temporal brain data into input neurons of a SNNr. The input
neurons have the same coordinates in the SNNr as the Talairach coordinates
of the brain locations (1-20 EEG channel allocation systems, 64 channels)

| EEG Chanel (input data variable) | Talairach coordinates [x avg (mm) y avg (mm) z avg (mm)] (also 3D coordinates of input neurons in the SNNr) | Gyri | Brodmann Area |
|---|---|---|---|
| PO7 | −44.0 ± 4.7 −81.7 ± 4.9 1.6 ± 10.6 | R OL | Middle occipital G 18 |
| PO3 | −33.3 ± 6.3 −84.3 ± 5.7 26.5 ± 11.4 | R OL | Superior occipital G 19 |
| POz | 0.0 ± 6.5 −87.9 ± 6.9 33.5 ± 11.9 | M OL | Cuneus 19 |
| PO4 | 35.2 ± 6.5 −82.6 ± 6.4 26.1 ± 9.7 | R OL | Superior occipital G 19 |
| PO8 | 43.3 ± 4.0 −82.0 ± 5.5 0.7 ± 10.7 | R OL | Middle occipital G 18 |
| O1 | −25.8 ± 6.3 −93.3 ± 4.6 7.7 ± 12.3 | L OL | Middle occipital G 18 |
| Oz | 0.3 ± 5.9 −97.1 ± 5.2 8.7 ± 11.6 | M OL | Cuneus 18 |
| O2 | 25.0 ± 5.7 −95.2 ± 5.8 6.2 ± 11.4 | R OL | Middle occipital G 18 |

The invention claimed is:

1. A computer-implemented method of creating an evolving spiking neural network personalized model Mx for determining a future outcome or a classification, for a scenario of interest, that is specific to a subject x having input data SSTDx, wherein the input data SSTDx of subject x comprises a number of static and temporal/spatio-temporal variables relating to the scenario of interest and wherein the model Mx comprises a three-dimensional spiking neural network reservoir and a spiking neural network classifier, the method comprising:

extracting, from a global dataset D of samples, the samples having the same static and temporal/spatio-temporal variables relating to the scenario of interest as SSTDx and for which an outcome or classification is known, a subset Kx of samples having static variables that most closely accord to the static variables of the input data SSTDx, encoding the temporal/spatio-temporal variables of Kx into spike sequences, wherein the spike sequences represent individual input patterns;

constructing the three-dimensional spiking neural network reservoir to comprise spatially located neurons;

mapping the temporal/spatio-temporal variables of Kx to spatially located reservoir input neurons according to:
(i) a known spatial location of the spatio-temporal variables of Kx, whereby spatially close spatio-temporal variables are mapped to spatially close input neurons; or (ii) a temporal similarity of the temporal variables of Kx, whereby high correlated spike sequences are mapped to spatially close input neurons;

training the spiking neural network reservoir to learn the spike sequences;

constructing the spiking neural network classifier; and training the spiking neural network classifier to recognise and classify similar spike sequences in relation to the known outcomes or classifications.

2. The method of claim 1, wherein the step of mapping spatio-temporal variables into the reservoir comprises mapping spatio-temporal brain data, including EEG, fMRI and other brain data, using a standard brain structural template.

3. The method of claim 1, wherein the spiking neural network classifier is also trained, when recalled on new data, to classify spike sequences before the entire spike sequence has propagated through the spiking neural network reservoir.

4. The method of claim 1, wherein the subject is an individual.

5. A method of determining a future outcome or classification, for a scenario of interest, specific to subject x, the method comprising:

inputting SSTDx data into the model Mx created according to the method of claim 1 to determine from the model Mx the future outcome and/or the classification for subject x.

6. A computer-implemented method of generating a prediction of stroke occurrence for an individual using the method of claim 5.

7. A computer-implemented method of classifying unclassified SSTD brain data (STBD) using the method of claim 5.

8. The method of claim 7, wherein the input data SSTDx is or comprises STBD of the subject x and wherein the global dataset D of samples comprises an archive of STBD, and wherein the model Mx is a brain data classification model, wherein the method comprises:

training the brain data classification model using the archive brain data, the archive brain data comprising STBD with known classifications, wherein training the brain data classification model comprises the steps of:

providing the archive brain data as inputs to the spiking neural network reservoir to train the spiking neural network reservoir to provide similar spiking activity patterns for similar input spike sequences to the spiking neural network classifier; and using the known classifications to train the spiking neural network classifier to recognise and classify similar spiking activity patterns; and using the brain data classification model to classify the unclassified brain data SSTDx of subject x.

9. A computer-implemented method of controlling a state of an apparatus using brain signals of the subject x using the method of claim 7, wherein the scenario of interest is a desired state of the apparatus, wherein the method comprises:

determining the desired state of the apparatus based on the classified brain data; and sending data indicative of the desired state of the apparatus to a controller, wherein the controller is configured to control the apparatus in accordance with the desired state of the apparatus.

10. The method of claim 9 wherein the method of controlling a state of an apparatus is applied to a method of rehabilitation, wherein the subject x is a patient, the patient being equipped with one or more rehabilitation actuator(s) adapted to induce movement of a body part, the brain data corresponding to a desired movement of the body part, the method comprising:

controlling the rehabilitation actuator(s) using brain activity of the patient to produce the desired movement of the body part; and if necessary, repeating the method until the patient improves his/her brain signals and body activity to produce the desired movement without the rehabilitation actuator.

11. A computer-implemented method of generating a prediction of an ecological event based on spatio-temporal data using the method of claim 5.

* * * * *